United States Patent [19]
Tanimori et al.

[11] Patent Number: 6,097,032
[45] Date of Patent: Aug. 1, 2000

[54] MICROSTRIP GAS CHAMBER HIGH-SPEED DATA ACQUISITION SYSTEM AND METHOD OF MEASURING SAMPLES BY USE OF THE SYSTEM

[75] Inventors: Toru Tanimori, Kanagawa; Atsuhiko Ochi, Tokyo, both of Japan

[73] Assignee: Japan Science and Technology Corporation, Japan

[21] Appl. No.: 09/089,882

[22] Filed: Jun. 3, 1998

[30] Foreign Application Priority Data

Jun. 27, 1997 [JP] Japan .................................. 9-171389
Apr. 2, 1998 [JP] Japan ................................ 10-089750

[51] Int. Cl.$^7$ .................................................. G01T 1/185
[52] U.S. Cl. ...................................... 250/374; 250/385.1
[58] Field of Search .................................. 250/374, 375, 250/385.1, 385.2

[56] References Cited

U.S. PATENT DOCUMENTS 4,379,967 4/1983 McIntyre ................................ 250/227

OTHER PUBLICATIONS

Angelini et al, "The Micro–gap Chamber" Nuclear Instruments & Methods in Physics Research, A 335 (1993) pp. 69–77, 1993.

*Primary Examiner*—Seungsook Ham
*Assistant Examiner*—Richard Hanig
*Attorney, Agent, or Firm*—Flehr Hohbach Test Albritton & Herbert LLP

[57] ABSTRACT

An imaging microstrip gas chamber (MSGC) high-speed data acquisition system capable of processing at high speed a large number of output signals of an imaging microstrip gas chamber. The system includes discrimination circuits for binary conversion of signals from anode strips and back strips of a two-dimensional microstrip gas chamber; signal synchronizing circuits for converting binary asynchronous signals output from the discrimination circuits into clock-synchronized signals; data encoder circuits connected to the signal synchronizing circuits; an incident-particle hit judgment circuit connected to the data encoder circuits and operating such that when a plurality of adjacent signal lines receive signals at the same timing, a value corresponding to a signal line at the center of the adjacent signal lines is output, and when separated signal lines receive signals at the same timing, the signals are ignored; a storage device connected to the incident-particle hit judgment circuit and adapted to store, for each event, the vertical and horizontal coordinates of an incident particle, the timing of incidence of the particle, the degree of spreading of output signals, and the energy of the incident particle obtained from an overall pulse height; and a computer connected to the storage device.

12 Claims, 29 Drawing Sheets

F I G. 8
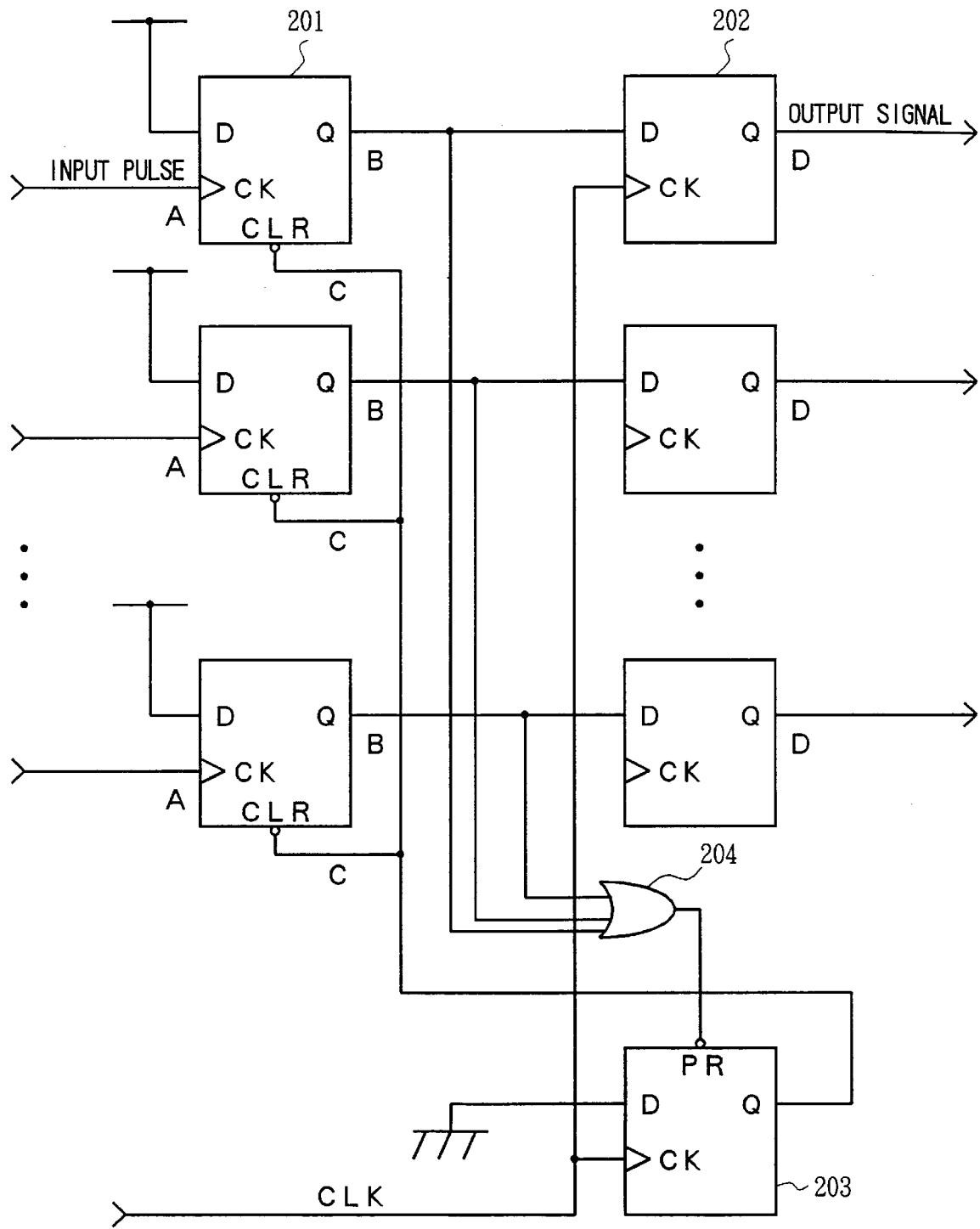

F I G. 11(a)
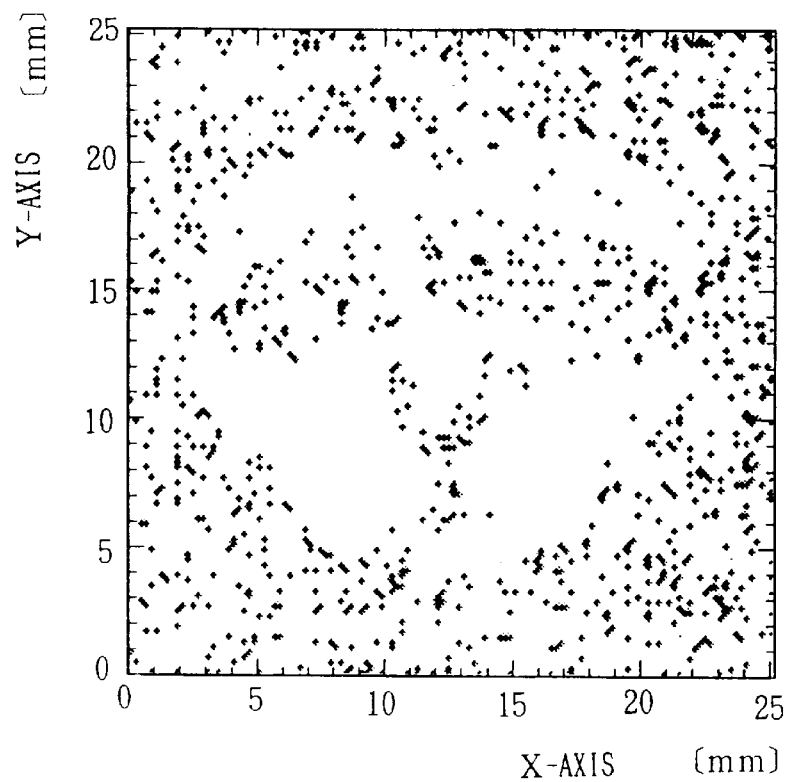
F I G. 11(b)
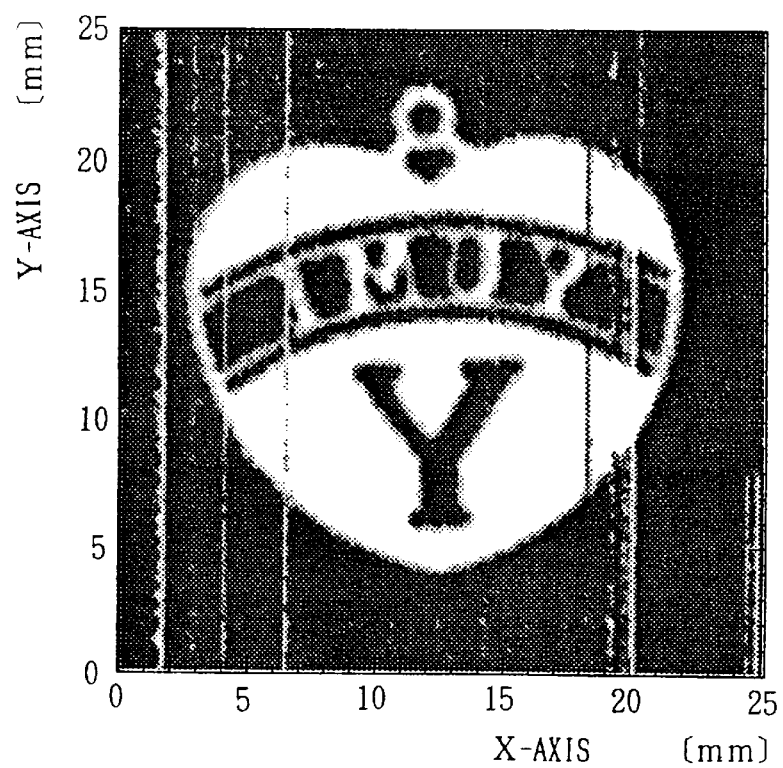

F I G. 14
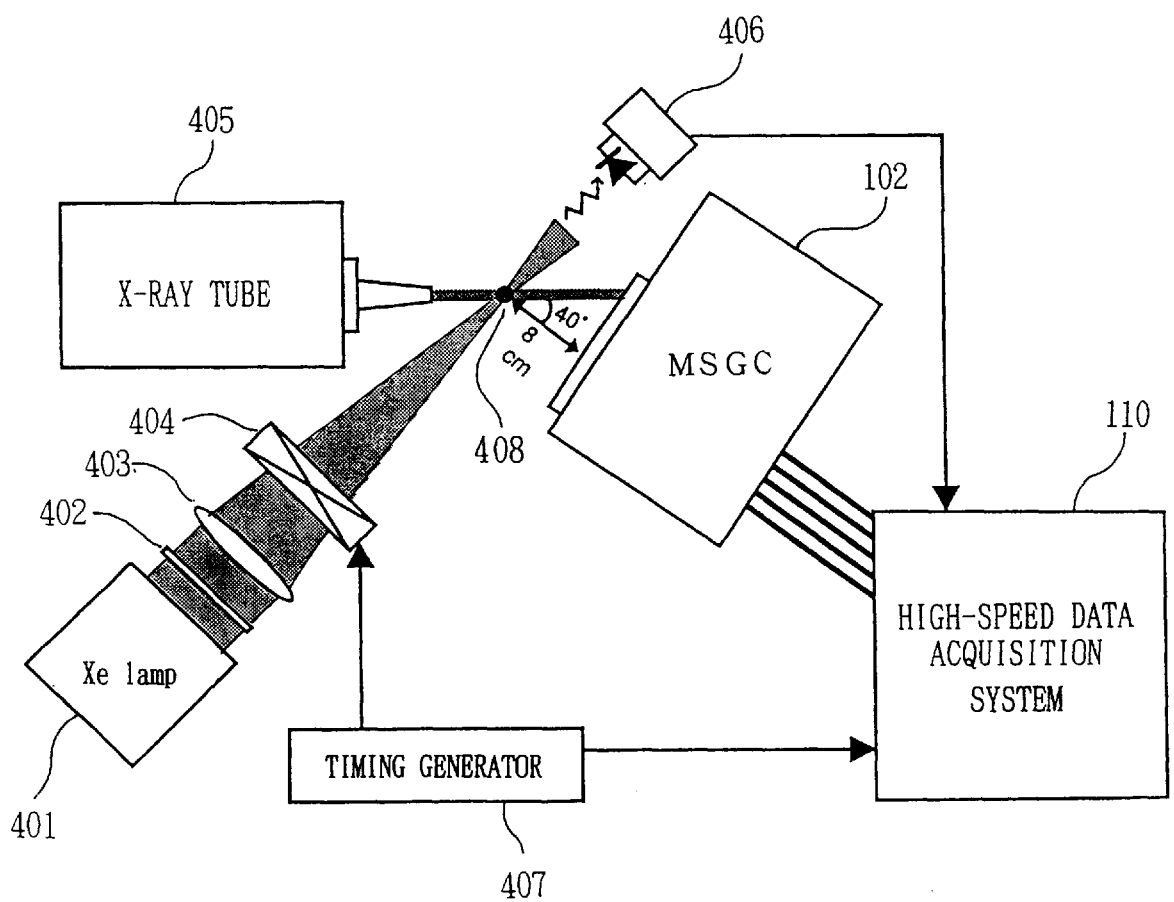

F I G. 15
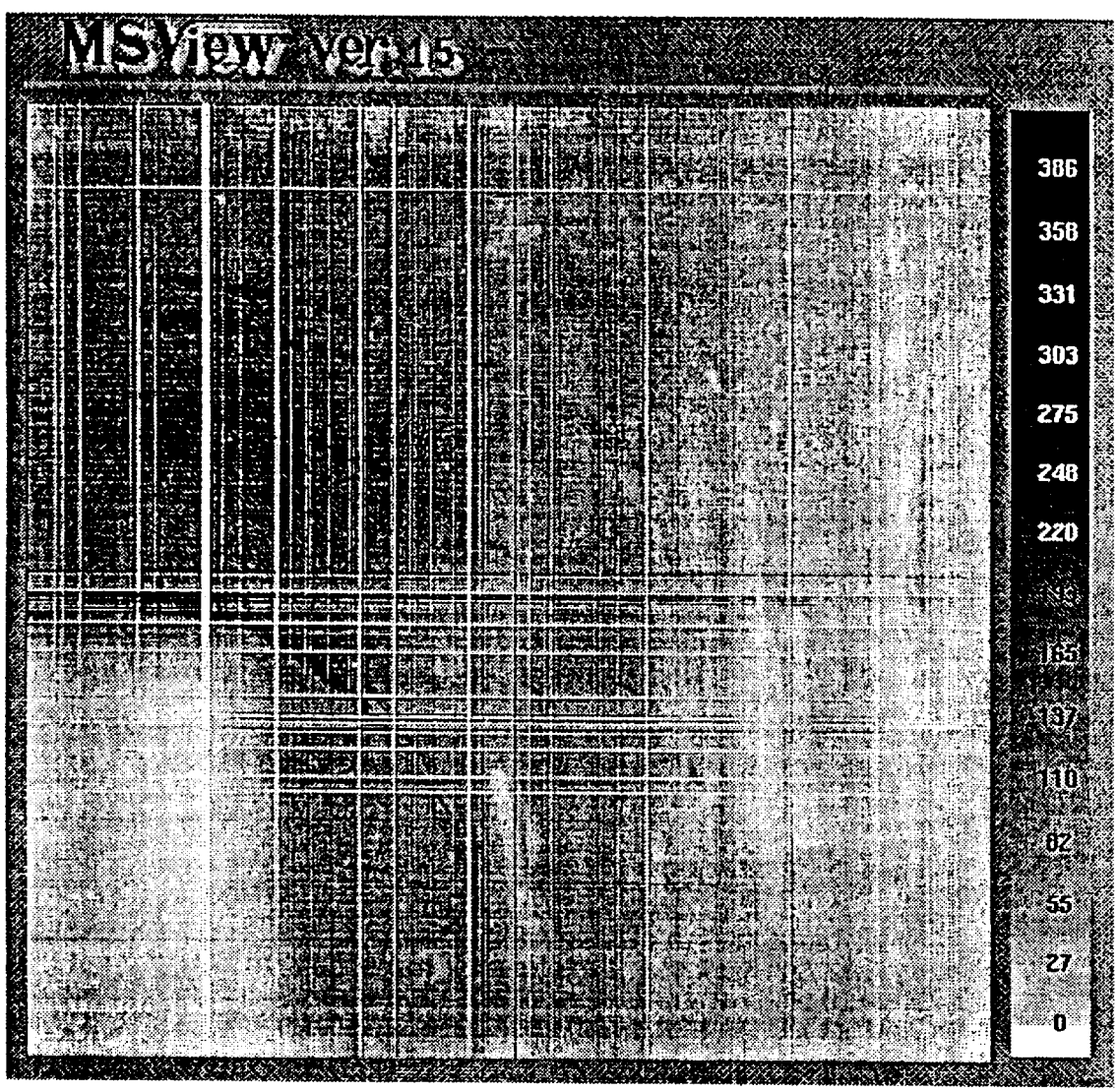

F I G. 18
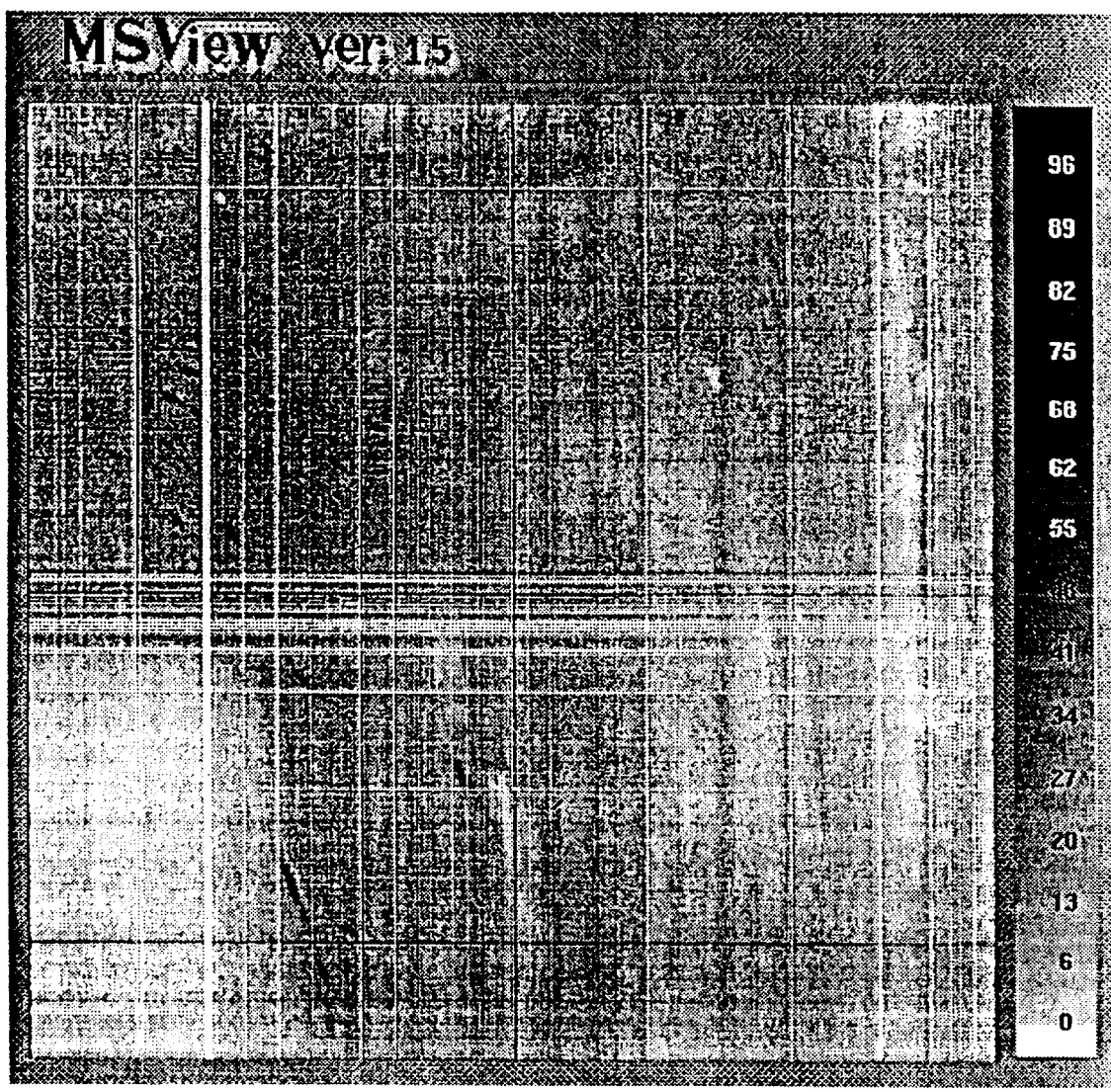

F I G. 19
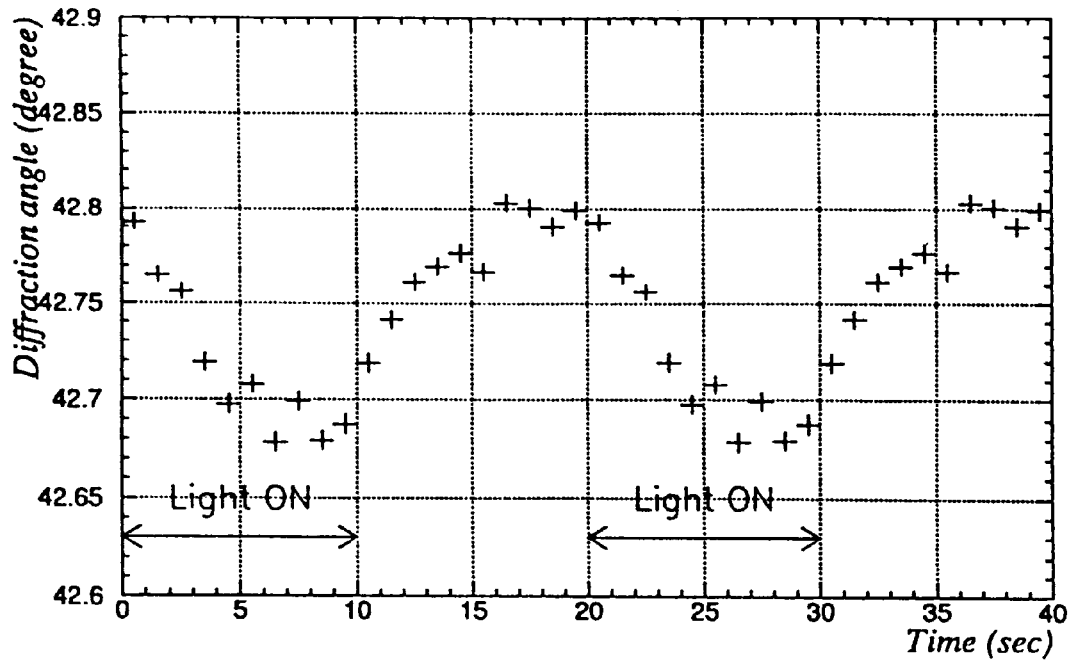
F I G. 20
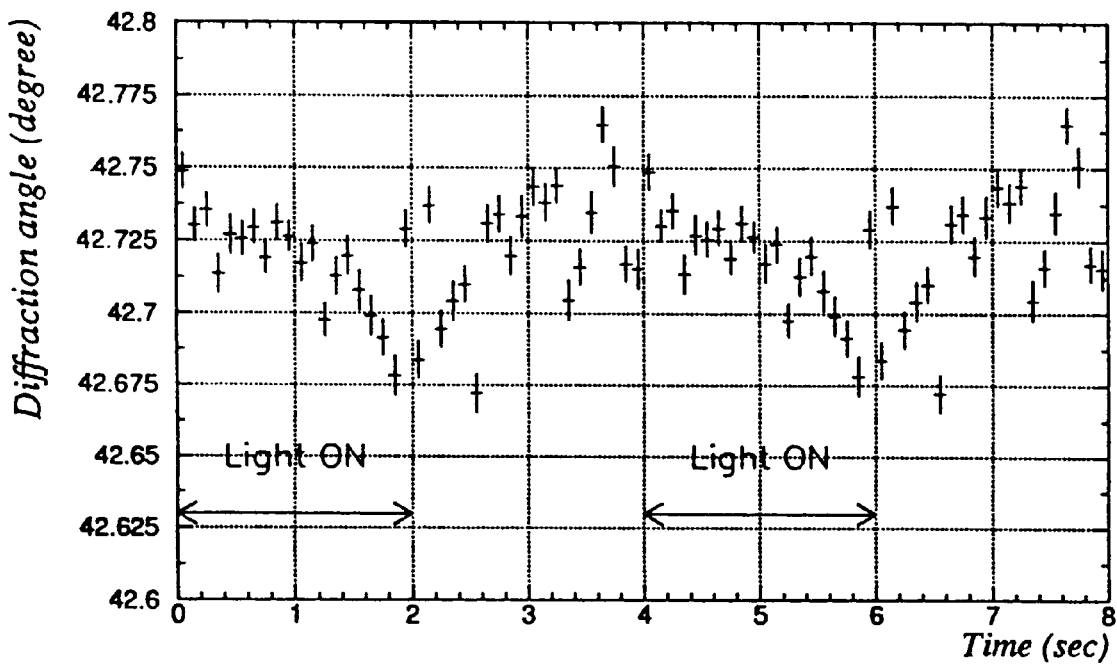

F I G. 22(a)
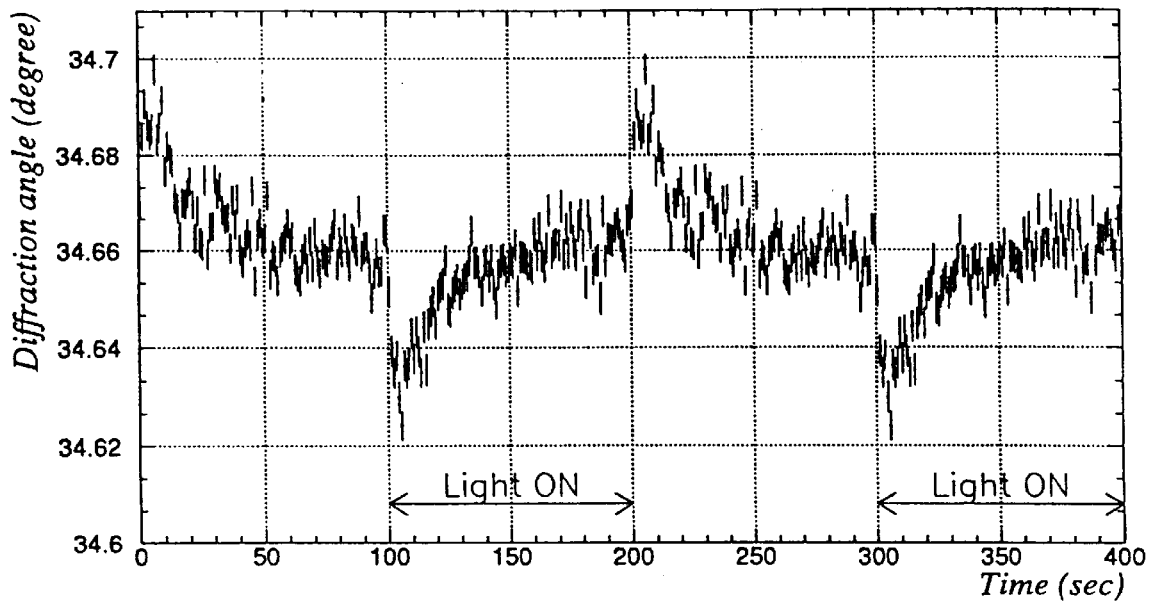
F I G. 22(b)
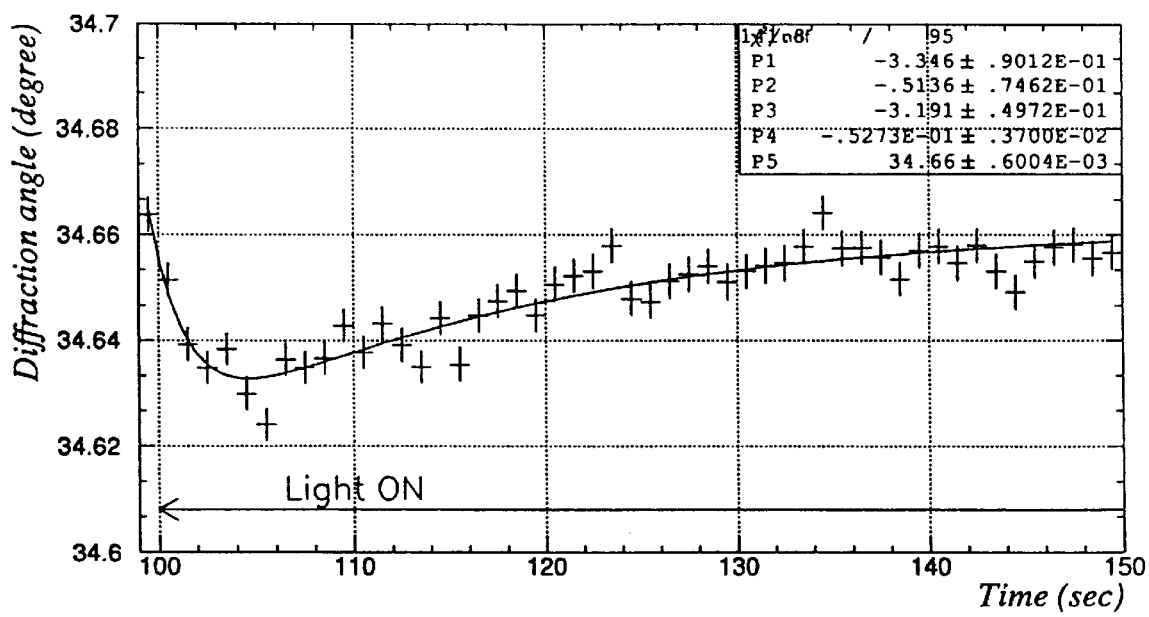

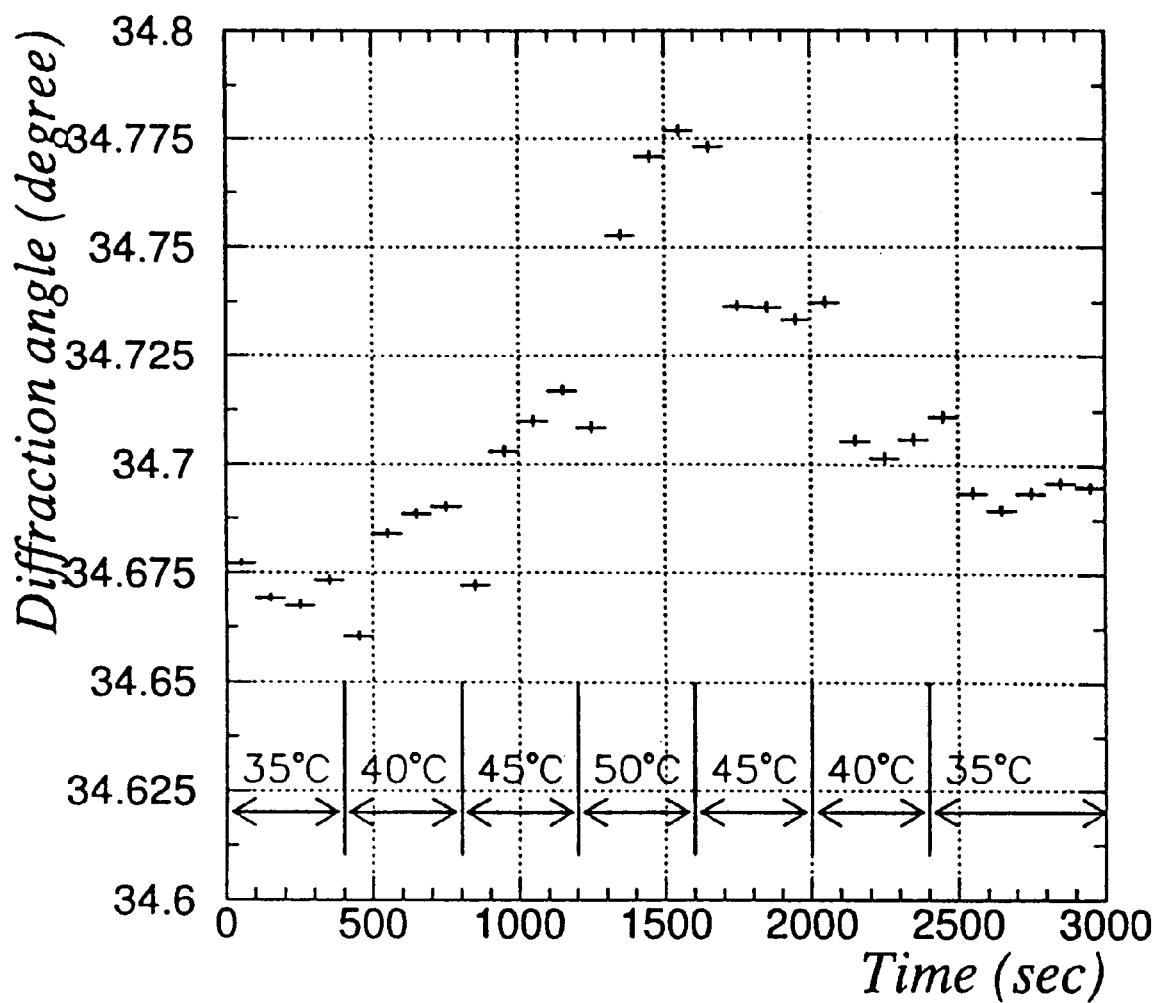
F I G. 23

F I G. 24
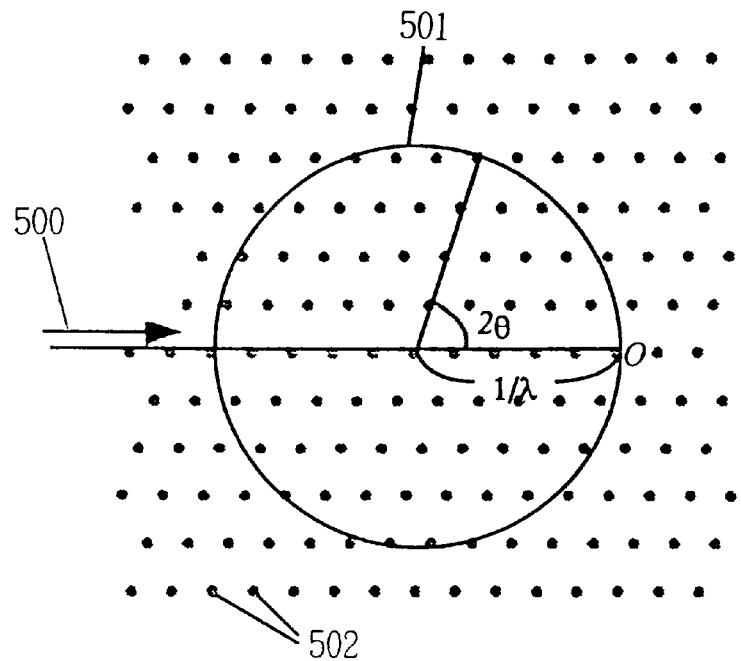
F I G. 25
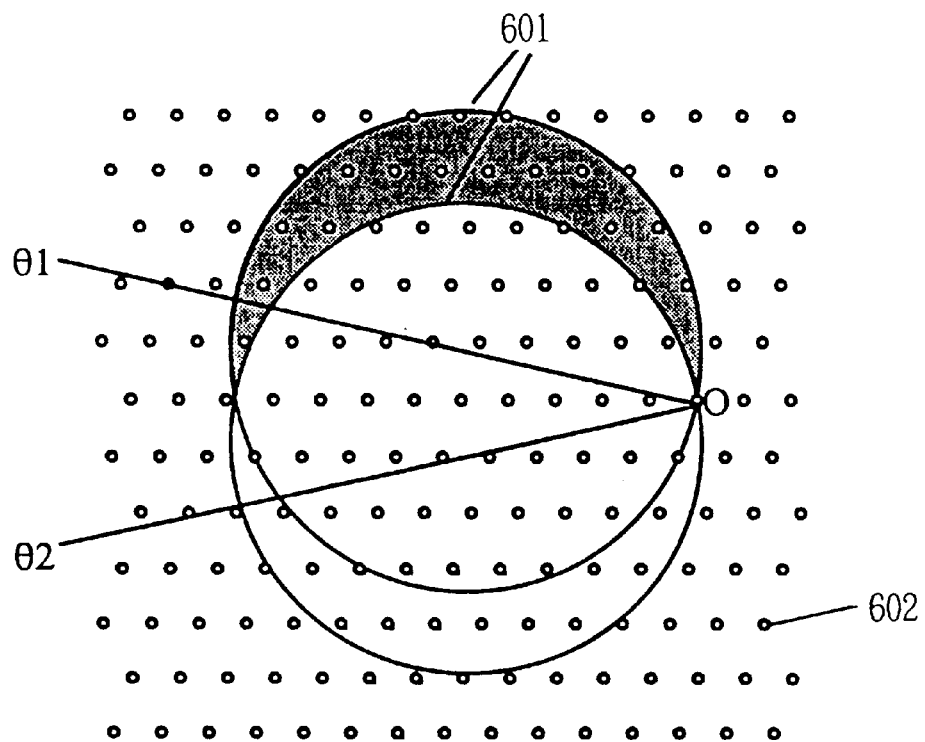

F I G. 28
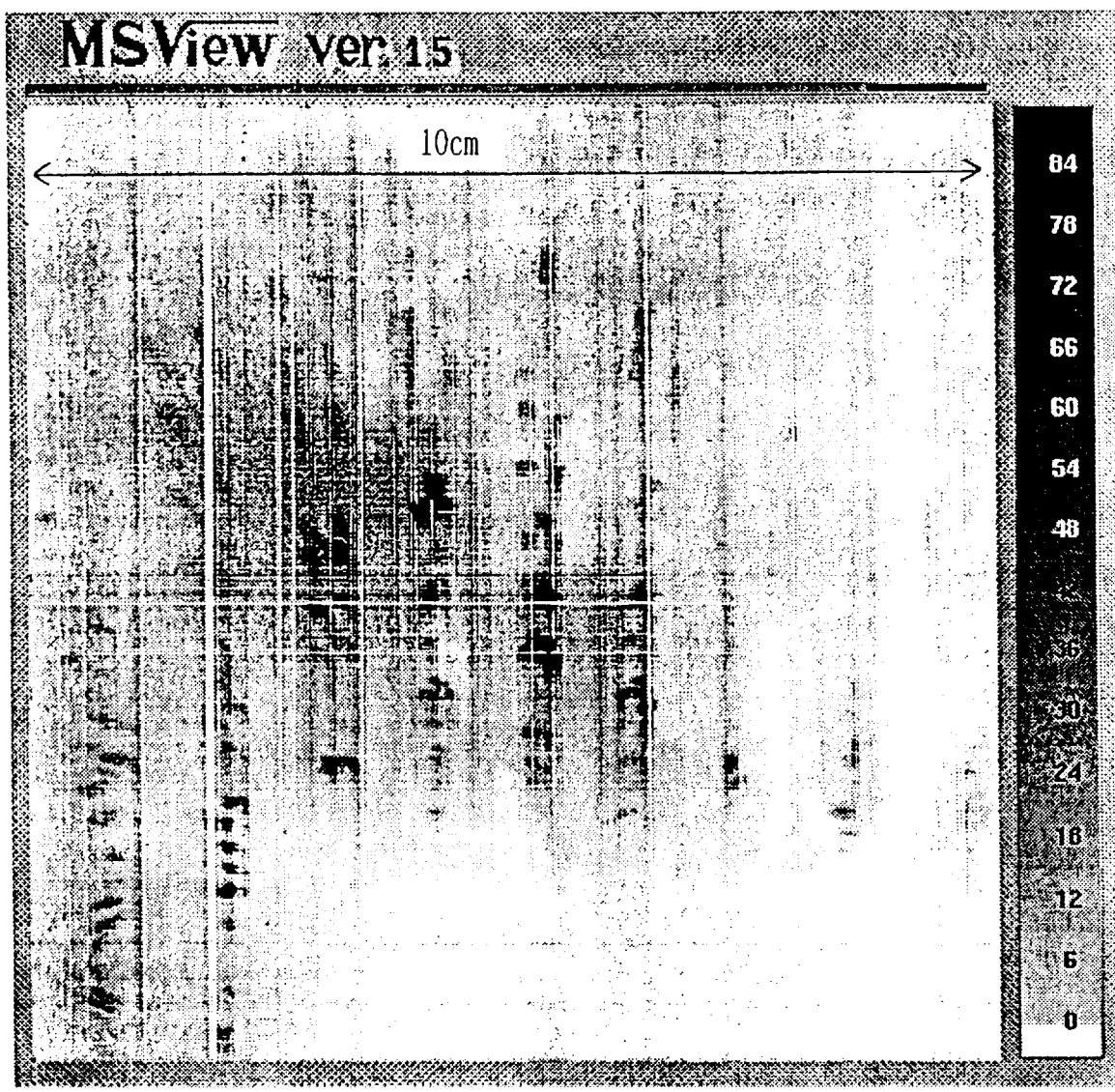

F I G. 32
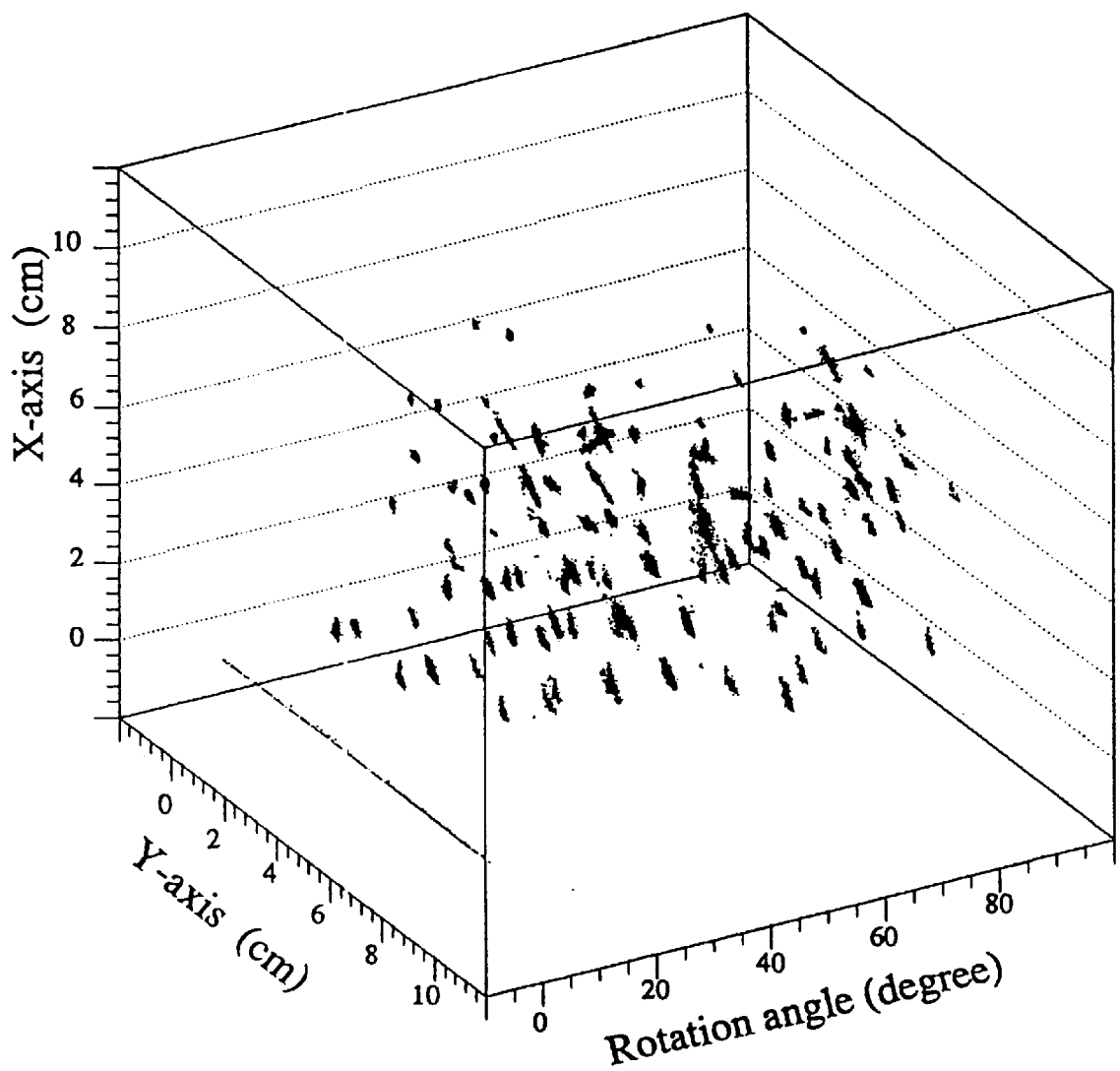

MICROSTRIP GAS CHAMBER HIGH-SPEED DATA ACQUISITION SYSTEM AND METHOD OF MEASURING SAMPLES BY USE OF THE SYSTEM

BACKGROUND OF THE INVENTION

1. Fields of the Invention

The present invention relates to an imaging microstrip gas chamber (MSGC) high-speed data acquisition system and to a method of measuring samples by use of the system.

2. Description of the Related Art

A microstrip gas chamber (MSGC) was proposed in 1988 by A. Oed as a new type of a gas-amplification-type particle counter having excellent position resolution and time resolution. Further, the inventors of the present invention improved the counter to obtain a two-dimensional image detector, an achievement just one step short of realizing practical use. In addition to having excellent position resolution, the counter has a considerably short dead time for a gas amplifier. Therefore, there exists great expectation that the counter will be used to detect high-intensity particles. A test utilizing an X-ray has confirmed that the sensor operates without problem even under an intensity of $10^7$ cps/mm$^2$ or higher.

However, since the MSGC has a huge number of signal outputs, on the order of a few hundred to a few thousand, extracting signals from the outputs in order to locate the position of an incident particle is difficult.

One conventionally-used method for data acquisition is a charge distribution method in which all signal lines are connected through resistors disposed between adjacent signal lines, and the heights of electrical signal pulses from opposite ends of the lines are measured to obtain a position of an incident particle on the basis of the ratio between the heights of electrical signal pulses.

However, in this method, the heights of pulses must be measured to a relatively high accuracy. Therefore, it has been very difficult to handle very weak signals (electron number: not greater than $10^6$) in, for example, cases where X-rays or high-energy charged particles are observed by use of an MSGC.

Further, a time interval of a few hundred nsec. to a few $\mu$sec. has been required to convert the height of a pulse to a high accuracy (8 bits or more) digital signal for computation.

Also, there has existed another method in which all signal lines are connected through a delay line (delaying device) instead of resistors, and a position of an input signal is obtained on the basis of the time difference between the signals appearing at opposite ends of the delay line. In this method, the position resolution in detecting particles can be increased through an improvement in the accuracy of the operation for obtaining a difference in arrival time between the signals. However, the use of a delay device makes high-speed data acquisition theoretically impossible.

Reading outputs from all signal lines is considered a most reliably and high-speed data acquisition method. However, in order to obtain a two-dimensional image, signal outputs for each of vertical and horizontal directions must be read out together with their timings. Therefore, an electronic apparatus for such an operation becomes huge.

Conventionally, the inventors of the present invention have employed a method in which outputs of all signal lines are input to a timing digital converters (TDC) after being converted into binary signals (on/off signals), and all the outputs from the TDC are read out by a computer, where a position of an incident signal is obtained by means of software.

However, in this method, the amount of data to be transferred from the TDC to the computer is huge, the transfer requires a prolonged period of time, and the speed of the processing performed in the computer cannot be increased. Therefore, the data acquisition capability of the conventional method is limited to ~1000 cps.

Generally, more than a few tens of thousands particles are required for a single image frame, and more than a few tens of frames per second are required for capturing the images as a dynamic, movie-like display. Further, even in the case where the number of particles in each image frame is small, if the time resolution of image acquisition can be increased (for example, about a few $\mu$sec.), it becomes possible to observe phenomena that have conventionally been impossible to observe at all.

Especially, in fields where time-division photographing is performed through use of an X-ray diffraction method or radioscopy, there is a strong expectation for realization of a high-performance, real-time X-ray image detector. In recent years, large facilities for strong synchrotron radiation, such as the SPring 8 facility, have been constructed as X-ray sources. Therefore, there is a demand for an image detector that matches such an X-ray source.

Since the MSGC is a gas detector having a very narrow inter-signal line pitch of 200 $\mu$m, the MSGC has the following features:

(1) high position resolution of about 100 $\mu$m;

(2) high rate capacity for incident particles of $10^7$ cps/mm$^2$ or higher; and (3) fine time resolution of about 50 nsec.

Therefore, the performance of the MSGC is sufficient to satisfy the demand of a new synchrotron radiation experiment.

However, the incident rate capacity of the conventional data acquisition system is far below the above-described desired capacity. Therefore, there must be constructed a high-speed data acquisition system which can fully utilize the capacity of the MSGC; i.e., which can process/record X-ray events occurring at a rate of $10^6$ cps or higher.

In such a high-speed data acquisition system, there cannot be used the conventional method in which data from respective signal lines are taken into a computer or the like and are processed by means of software.

SUMMARY OF THE INVENTION

In view of the foregoing problems, an object of the present invention is to provide an imaging microstrip gas chamber (MSGC) high-speed data acquisition system which can process at high speed a large number of output signals of an imaging microstrip gas chamber.

Another object of the present invention is to provide a method of measuring samples by use of the high-speed data acquisition system.

In order to achieve the object, the present invention provides a two-dimensional microstrip gas chamber high-speed data acquisition system comprising: discrimination circuits for binary conversion of signals from anode strips and back strips of a two-dimensional microstrip gas chamber; signal synchronizing circuits for converting binary asynchronous signals output from the discrimination circuits into clock-synchronized signals; data encoder circuits connected to the signal synchronizing circuits; an incident-particle hit judgment circuit connected to the data encoder circuits and operating such that when, among a plurality of input signal lines for each of the vertical and horizontal axes, a plurality of adjacent signal lines receive signals at the same timing, the incident-particle hit judgment circuit outputs a value corresponding to a signal line at the center of the adjacent signal lines, and when separated signal lines receive signals at the same timing, the incident-particle hit judgment circuit ignores the signals; a storage device connected to the incident-particle hit judgment circuit and adapted to store, for each event, the vertical and horizontal coordinates of an incident particle, the timing of incidence of the particle, the degree of spreading of output signals, and the energy of the incident particle obtained from an overall pulse height; and a computer connected to the storage device.

In the high-speed data acquisition system, since a large number of output signals of the microstrip gas chamber can be processed at high speed, measurement of particles can be performed reliably.

Preferably, an amplifier is connected to each of the anode strips and back strips of the two-dimensional microstrip gas chamber, and an output signal from the amplifier is input to the corresponding discrimination circuit.

In this case, since feeble signal pulses are amplified, reliable discrimination signals can be obtained.

Preferably, the data encoder circuit comprises an upper priory encoders, a lower priority encoders, and an adding circuit, wherein the values of signals transmitted through upper and lower signal lines are obtained through use of the upper priory encoder and the lower priority encoder, and the mean value of the thus-obtained values is used for calculation of the coordinates of an incident particle.

In this case, the two-dimensional coordinates of an incident particle can be obtained accurately.

Preferably, each of the signal synchronizing circuits, the data encoder circuits, and the incident-particle hit judgment circuit is formed of a CPLD (Complex Programmable Logic Device).

In this case, since the circuits of the data acquisition system can be integrated, the size of the data acquisition system can be decreased.

Preferably, the two-dimensional microstrip gas chamber comprises a substrate formed of organic thin film having elasticity; anode strips and cathode strips formed on the substrate to be alternately arranged in parallel; a high voltage source for applying high voltage between the anode strips and the cathode strips; back strips formed on the lower face of the substrate to intersect the anode strips and the cathode strips; a drift plane disposed a predetermined distance away from the substrate; and a gas source for supplying a gas to be passed through a space between the surface of the substrate and the drift plane, wherein electron amplification effect of the gas is caused, and signals regarding an X-ray or particle are extracted for simultaneous measurement of the two-dimensional coordinates of the X-ray or particle.

In this case, it becomes possible to provide a two-dimensional MSGC having a large area and sufficient flexibility suitable for use in the high-speed data acquisition system.

In the two-dimensional microstrip gas chamber having the above-described structure, the opposite edge portions of each of the cathode strips are preferably coated with organic thin film having elasticity.

In this case, breakage of the electrodes can be prevented effectively.

In the two-dimensional microstrip gas chamber having the above-described structure, the organic thin film having elasticity is preferably polyimide film.

In this case, the surface area can be increased, so that a uniform image can be drawn on a flexible surface.

In the two-dimensional microstrip gas chamber having the above-described structure, the surface of the substrate is preferably coated with organic titanium in order to control the surface resistance.

In this case, charging at the substrate surface can be suppressed through control of the surface resistance of the substrate.

In the two-dimensional microstrip gas chamber having the above-described structure, an IC package is preferably provided under the back strips, wherein the IC package is an LSI high-density package.

In this case, a compact and highly integrated two-dimensional MSGC can be provided. Further, a large two-dimensional MSGC having a large effective area of, for example, 10 cm×10 cm can be designed. This two-dimensional MSGC having about 1000 channels can be mounted directly on a circuit board, and amplifiers can be disposed thereon.

In the two-dimensional microstrip gas chamber having the above-described structure, preferably, the back strips are connected to first bonding pads on the top surface of the substrate through fine through-holes; the edge portion of the IC package is raised to form a wall portion; second bonding pads are formed on the top surface of the wall portion; and the first and second bonding pads are connected with each other through use of bonding wires.

The above-described structure increases the degree of integration while facilitating wiring work. Further, above-described structure allows use of a various kinds of micro-electronics techniques generally employed in the semiconductor field, such as formation of through-holes and micro resistors and capacitors.

The two-dimensional microstrip gas chamber having the above-described structure is preferably used as an X-ray imaging detector by use of X-ray irradiation.

In this case, there can be obtained an X-ray imaging detector that provides stable operation even under strong X-ray irradiation. That is, proper operation is possible even when the level of X-ray irradiation is as high as $2 \times 10^7$ Hz/mm$^2$. Further, there can be obtained very clear images having a high position resolution of 100 $\mu$m or better.

The present invention also provides a method of measuring a sample, comprising the step of constructing a microstrip gas chamber high-speed data acquisition system including: discrimination circuits for binary conversion of signals from anode strips and back strips of a two-dimensional microstrip gas chamber; signal synchronizing circuits for converting binary asynchronous signals output from the discrimination circuits into clock-synchronized signals; data encoder circuits connected to the signal synchronizing circuits; an incident-particle hit judgment circuit connected to the data encoder circuits and operating such that when among a plurality of input signal lines for each of the vertical and horizontal axes a plurality of adjacent signal lines receive signals at the same timing, the incident-particle hit judgment circuit outputs a value corresponding to a signal line at the center of the adjacent signal lines, and when separated signal lines receive signals at the same timing, the incident-particle hit judgment circuit ignores the signals; a storage device connected to the incident-particle hit judgment circuit and adapted to store, for each event, the vertical and horizontal coordinates of an incident particle, the timing of incidence of the particle, the degree of spreading of output signals, and the energy of the incident particle obtained from an overall pulse height; and a computer connected to the storage device, wherein the two-dimensional microstrip gas chamber includes: a substrate formed of organic thin film having elasticity; anode strips and cathode strips formed on the substrate to be alternately arranged in parallel; a high voltage source for applying high voltage between the anode strips and the cathode strips; back strips formed on the lower face of the substrate to intersect the anode strips and the cathode strips; a drift plane disposed a predetermined distance away from the substrate; and a gas source for supplying a gas to be passed through a space between the surface of the substrate and the drift plane, wherein an X-ray beam is radiated onto a moving sample, and the process of fast changes of the sample is directly observing by X-ray diffraction.

The measuring method of the present invention enables directly observation of the process of fast changes in a moving sample through radiation of an X-ray beam and X-ray diffraction, thereby contributing the study of the sample.

In the measuring method of the present invention, the sample is preferably a solid crystal, and the process of changes in the structure of the solid crystal is directly observed.

In this case, it is possible to directly observe the process of changes in the structure of a solid crystal by use of X-ray diffraction, which in turn enables high-speed, precise measurement of solid crystal behavior.

In the measuring method of the present invention, the process of change in the sample is preferably measured at intervals of 1/1000 second or less.

In this case, the process of change in the sample can be measured with high time resolution.

Preferably, the measuring method of the present invention is used to observe an excited state of the solid crystal.

In this case, the excited state of the solid crystal can be measured quickly and precisely.

In the measuring method of the present invention, preferably, measurement is performed in accordance with a rotation continuous photograph method; and the position of an X-ray resulting from X-ray diffraction during the measurement and the timing of the X-ray diffraction are measured so as to determine a three-dimensional crystalline structure.

In this case, the process of change in a three-dimensional crystal can be measured quickly and precisely.

Since the MSGC has a large number of signal output lines, there exists a problem in relation to the manner of processing information from the output lines. In order to simplify the circuit and to construct a feasible system, in the present invention, analog information (height of each pulse) output from each signal line is discarded. Instead, a certain threshold is set, and the presence/absence of a signal in each signal line is checked on the basis of the threshold. Thus, a signal from a signal line is treated as a digital signal of one bit. When this method is used in a conventional wire chamber, position resolution decreases drastically. By contrast, since the MSGC has a very narrow inter-signal line distance, even when the above-described method is employed, there can be obtained a performance comparable to that obtained in the case where analog information from the signal lines is used.

Through use of a logic circuit, the vertical coordinate and the horizontal coordinate of the incident position of a particle are obtained from the digital signals, and a two-dimensional position coordinates are determined on the basis of the vertical and horizontal coordinates measured at the same timing. Thus-determined two-dimensional coordinates are accumulated in a dedicated storage device (memory). Since the storage device can be accessed from the computer, acquired data can be processed in real time.

Thus, the present invention enables acquisition of data regarding 10 million events per second, which amount is 5000 or more times that of the conventional system. This enables the capture of changes with time in X-ray or particle images, so that the images can be captured as moving images.

In order to realize the system of the present invention, the following measures are employed:

(a) Conversion of output signals from the MSGC into binary (on/off) signals has the effect of simplifying the circuit.

(b) Conversion of asynchronous input signals to clock-synchronized signals eliminates timing hazard which would otherwise occur in subsequent stages. Thus, reliability is increased. Further, the clock synchronization enables pipeline processing, which will be described later.

(c) PLD (Programmable Logic Device) is used for implementation of the circuit. This enables a complicated logical operation to be performed by use of a small number of devices, and also enables construction of a single system at lower cost and through a shorter development period, compared with the case of manufacturing custom LSIs such as dedicated gate arrays.

(d) The processing in the circuit is performed such that when a plurality of adjacent signal lines among a plurality of signal lines for each of the vertical and horizontal axes receive signals at the same timing, a value corresponding to a signal line at the center of the adjacent signal lines is output, and when separated signal lines receive signals (duplicate signals) at the same timing, the signals are ignored.

(e) Within the circuit, signals are processed in accordance with a pipeline scheme. In each processing stage, data can be processed immediately after the previous data have been sent out to the subsequent processing stage. Therefore, input of signals can be performed for every clock. The respective simplified processing stages can operate at a clock speed of 20 MHz. For the entire circuit, the processing can be performed as fast as about 100 MHz in terms of the frequency of pulses from the MSGC.

(f) The presence of an input signal is determined only when a signal input for the vertical direction and a signal input for the horizontal direction are both detected in a single clock cycle and no duplication is detected.

(g) For each event, the system records the vertical and horizontal coordinates of the incident position of a particle, the timing (not greater than 0.1 $\mu$sec.) of incidence of a particle, the degree of spreading of output signals, and the energy of the incident particle obtained from the overall pulse height.

(h) The logic circuit converts about 1000 input signals into data of about 30 bits for each event, which are then stored in the large capacitance storage device via a FIFO (First-In First-Out) circuit.

(i) Since all data acquired through a single data acquisition operation are stored in the storage device, the high-speed data acquisition operation can be continued unbrokenly until the amount of stored data exceeds the storage capacity.

(j) The components and devices of the system (the encoders for encoding the incident position of each particle and the storage device) are connected with each other in accordance with VME (Versa Module European: 16-, 32-, 64-bit asynchronous bus) standard. Therefore, when a computer that conforms to the VME standard is used, the operation of the system and the retrieval of data from the storage device can be performed easily at high speed. Further, when the computer conforming to the VME standard is connected to a high-speed network, further detailed data processing can be performed on an external computer.

As described above, the present system can collect signals output from the MSGC at high speed and can cause the directly connected computer to analyze the collected signals.

BRIEF DESCRIPTION OF THE DRAWINGS

FIG. 8 is a diagram of a circuit (multi-channel) for synchronizing outputs from the MSGC;

FIGS. 11(a) and 11(b) are illustrations showing an example of a two-dimensional X-ray transmission image of a pendant obtained by use of the data acquisition system according to the embodiment of the present invention;

FIG. 14 is a block diagram showing a schematic view of the experiment setup;

FIG. 15 is a powder X-ray diffraction pattern of $VO(acac)_2$ obtained by an MSGC having a size of 10 cm×10 cm;

FIG. 18 is a rotation photograph of $[BU_4N]_4[Pt_2(pop)_4]$ taken through use of the 10 cm×10 cm MSGC;

FIG. 19 is a plot showing a first example of variation in diffraction angle due to on/off of light;

FIG. 20 is a plot showing a second example of variation in diffraction angle due to on/off of light;

FIGS. 22(a) and 22(b) are plots showing the movement of a diffraction peak in the photo excitation (0–5 sec. after light on/off) and that in the thermal effect (5–50 sec. after light on/off);

FIG. 23 is a plot showing the movement of the diffraction with variation in the temperature for a single crystal of $[BU_4N]_4[Pt_2(pop)_4]$ in which the diffraction point $2\theta=34.7°$ is used;

FIG. 24 is an illustration showing a reciprocal lattice space and an Ewald's sphere;

FIG. 25 is an oscillation photograph showing the Ewald's sphere;

FIG. 28 is a rotational image of phenothiazine-benzilic acid obtained through use of the 10 cm×10 cm MSGC;

FIG. 32 is an illustration showing a three-dimensional image obtained by use of the RCP method after application of noise reduction using the timing ($\phi$ axis) information.

DESCRIPTION OF THE PREFERRED EMBODIMENT

An embodiment of the present invention will next be described in detail with reference to the drawings.

Figure 1:
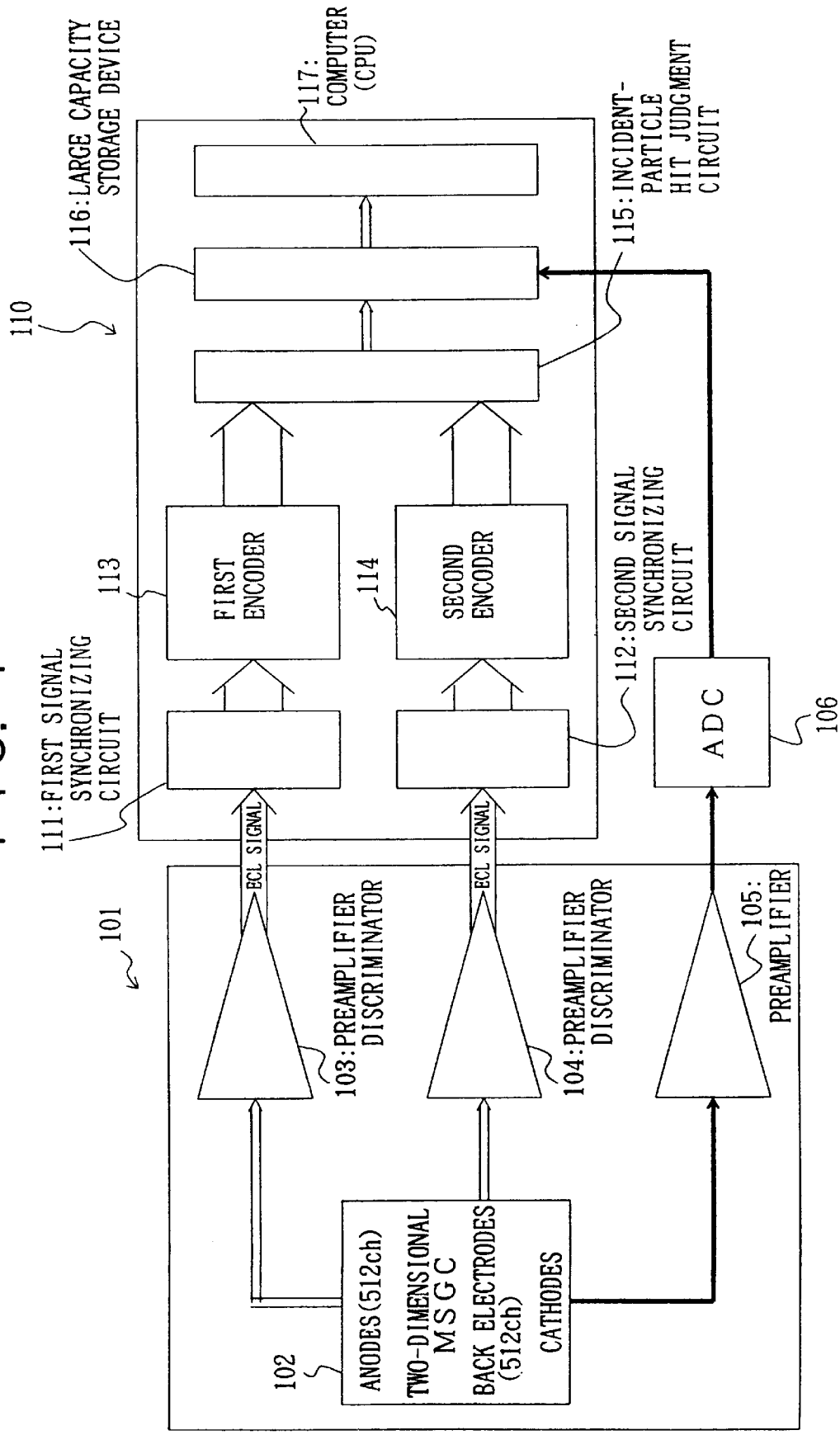
FIG. 1 is a block diagram showing the overall structure of an MSGC data acquisition system according to an embodiment of the present invention.

FIG. 1 shows a block diagram of an MSGC data acquisition system according to the embodiment of the present invention.

The MSGC data acquisition system of the present invention is generally composed of a two-dimensional MSGC, preamplifiers discriminators, signal synchronizing circuits, data encoders (for encoding particle incident positions), an incident-particle hit judgment circuit, a large capacity storage device, and a computer.

That is, as shown in FIG. 1, on a motherboard 101 are mounted the two-dimensional MSGC (hereinafter simply referred to as MSGC) 102, preamplifiers/discriminators 103 and 104, and a preamplifier 105.

Further, there are provided a first signal synchronizing circuit 111 for processing output signals (signals under the ECL standard) from anodes of the MSGC 102, a second signal synchronizing circuit 112 for processing output signals (signals under the ECL standard) from back strips of the MSGC 102, a first encoder 113 connected to the first signal synchronizing circuit 111, a second encoder 114 connected to the second signal synchronizing circuit 112, and the incident-particle hit judgment circuit 115, the large capacity storage device 116, and the computer 117. Thus, there is provided a data acquisition system 110 conforming to the VME standard.

The cathodes of the MSGC 102 are connected to the storage device 116 via the preamplifier 105 and an analog-to-digital converter (ADC) 106.

Next will be described in detail the respective portions of the MSGC data acquisition system.

Figure 2:
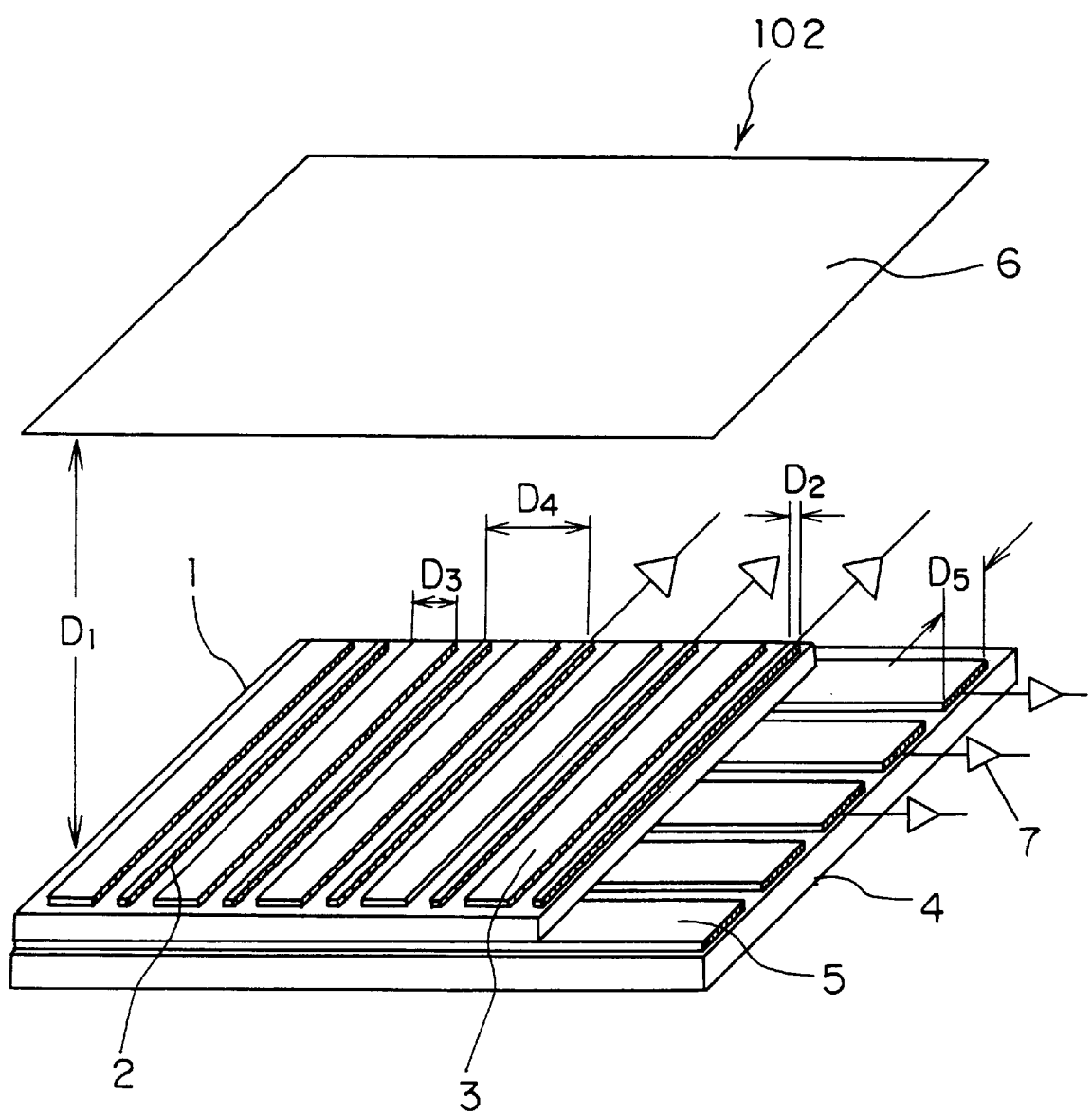
FIG. 2 is an exploded perspective view of the MSGC.

FIG. 2 shows an exploded perspective view of the MSGC according to the embodiment of the present invention. FIGS.

Figure 3A:
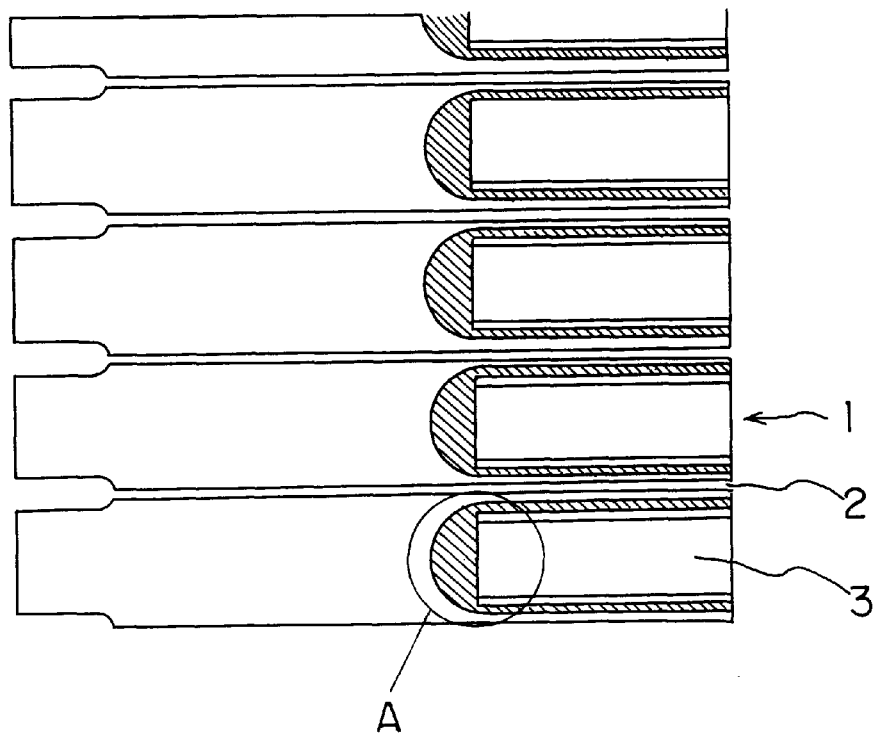
FIGS. 3(a) and 3(b) are views showing coated edges of cathodes strips of the MSGC.
Figure 3B:
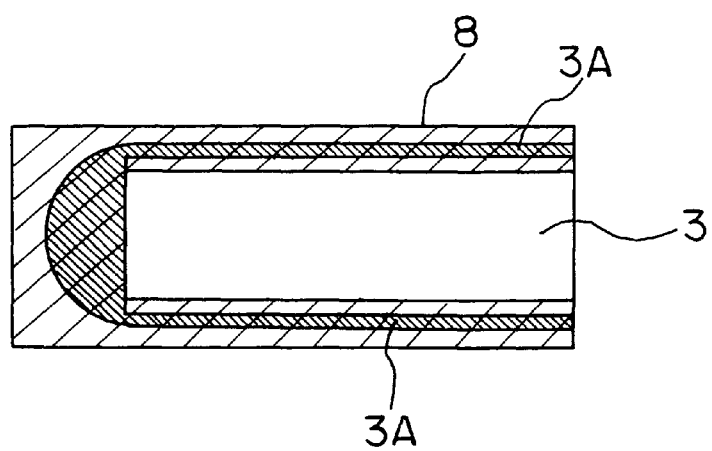

3(a) and 3(b) are views showing coated cathode edges, wherein FIG. 3(a) is a partial plan view of the cathodes, and FIG. 3(b) is an enlarged view of a portion indicated by symbol A in FIG. 3(a).

The two-dimensional MSGC 102 shown in FIGS. 2, 3(a), and 3(b) has an effective area of 10 cm×10 cm. Numeral 1 denotes a substrate formed of a polyimide thin film having a thickness of about 17 $\mu$m. Numeral 2 denotes anode strips formed on the substrate 1. Each of the anode strips 2 is formed of 1 $\mu$m-thick Au/Ti film and has a width $D_2$ of about 10 $\mu$m. Numeral 3 denotes cathode strips. Each of the cathode strips 3 is formed of 1 $\mu$m-thick Au/Ti film and has a width $D_3$ of about 100 $\mu$m. The anode strips 2 and the cathode strips 3 are arranged alternately such that the pitch $D_4$ of the anode strips 2 is about 200 $\mu$m.

Numeral 4 denotes a base substrate formed of ceramic, and numeral 5 denotes back strips formed on the base substrate 4 to be located under the substrate 1. Each of the back strips 5 is formed of 1 $\mu$m-thick Au/Ti film and has a width $D_5$ of about 180 $\mu$m.

The above-described dimensions of the various parts shown in FIGS. 2, 3(a), and 3(b) are mere examples, and may be changed freely.

Further, a drift plane 6 is disposed above the element having the above-described structure such that the distance $D_1$ between the element and the drift plane 6 becomes 1 cm. Thus, between the element and the drift plane 6 there is formed a chamber through which flows gas including argon and ethane. In general, a rare gas having a large atomic weight and suppressing discharge is used for the MSGC. For example, a mixed gas of methane, ethane, carbon dioxide, and the like may be used. Numeral 7 denotes amplifiers.

Since the substrate 1 is formed of polyimide thin film of about 17 $\mu$m thick, and the back strips 5 are formed on the base substrate 4 to be located under the polyimide thin film, two-dimensional readout can be performed through use of signals induced in the back strips 5. That is, use of the polyimide substrate 1 enables simultaneous measurement of two-dimensional coordinates. Since polyimide has a high degree of flexibility and elasticity, there can be manufactured a polyimide substrate having a large surface that is completely flat and smooth.

Further, through use of an MCM technique, polyimide film can be formed in a desired shape with an accuracy on the order of 1 micron. In the MSGC, a guarding mask for protecting the anode strips and through holes are formed by use of the MCM technique.

Therefore, theoretically the size of the two-dimensional MSGC can be increased to 20 cm×20 cm or larger.

In the above-described embodiment, the substrate is formed of polyimide. However, the MSGC of the present invention can be constructed from other organic material having elasticity. Examples of such organic material having elasticity include polyamide, polyamideimide, polysulfone, and polycarbonate, and among organic materials polyimide is preferred. Although the elastic organic film can have a thickness of 5–100 $\mu$m, a thickness of 10–30 $\mu$m is preferred.

In order to cause electron amplification by use of gas and to extract signals representing radiation rays, a voltage of 500 V must be applied to a gap (about 50 $\mu$m) between each anode strip 2 and the corresponding cathode strip 3. At this time, discharge is likely to occur between the anode strip 2 and the cathode strip 3. Such discharge breaks the electrodes and damages the MSGC 102. In order to suppress such discharge, as shown in FIG. 3, both edges 3A of the cathode strip 3 having a width of about 7 $\mu$m where discharge tends to occur are coated with polyimide thin film 8 having a thickness of a few $\mu$m.

In the MSGC 102 having a substrate structure, positive ions produced due to amplification occurring in the vicinity of the anode electrodes 2 adhere to the substrate 1 and cause a space-charge effect, resulting in a decreased gain. In view of the above, presently, there have been conducted studies to find a proper resistance value for the substrate formed of polyimide film. Therefore, organic titanium coating is provided on the surface of the polyimide film in order to control the surface resistance.

In order to realize a high position resolution of 100 $\mu$m or better, the MSGC 102 is designed such that for each of the X and Y directions, signals are extracted at a very small pitch of 200 $\mu$m. Therefore, when the MSGC has a size of 5 cm×5 cm, 500 or more signal lines must be connected to a corresponding number of amplifiers 7.

In the present invention, the MSGC is packaged on an LSI high density package in order to facilitate and improve the connection between the MSGC and a circuit board.

The coordinate values representing the position of an X-ray or a particle are determined through use of signals from the back strips 5 and the anode strips 2. The cathode strips 3 are used for measurement of energy loss of a particle in a MSGC gas. In order to reduce the number of readout channels, for readout purposes the cathode strips 3 are divided into groups each containing ten cathode strips. The signals are extracted from an IC package 11 (see FIG. 5) containing the MSGC.

Next, a description will be given of an electronic system for reading out signals from the MSGC.

Figure 4:
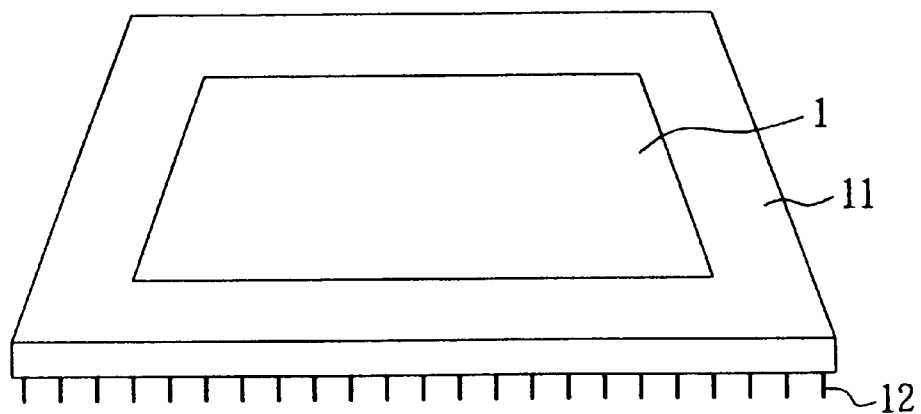
FIGS. 4(a) and 4(b) are views showing the structure of a PGA package on which a two-dimensional MSGC having a size of 5 cm×5 cm is mounted.
Figure 4:
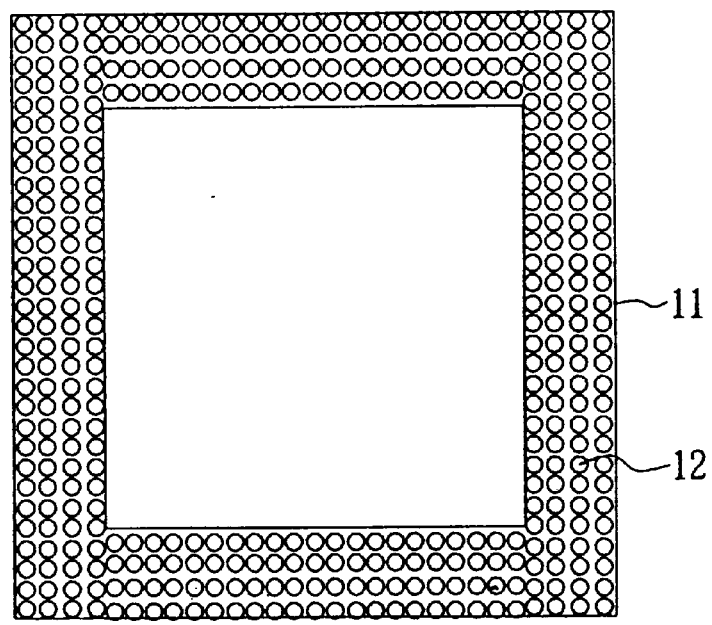

FIGS. 4(a) and 4(b) are views Showing the structure of a PGA package on which is mounted a two-dimensional MSGC of 5 cm×5 cm, wherein FIG. 4(a) is a perspective view of the package, while FIG. 4(b) is a bottom view of the package.

The IC package 11 is formed of ceramic, and 541 strips are provided on the bottom surface at a pitch of 0.1 inches. All of 254 anode strips, 255 back strips, and 17 groups of cathodes are connected to the IC package by means of gold wire bonding. Therefore, no wires are required to be connected directly to the plate of the MSGC 102.

Figure 5:
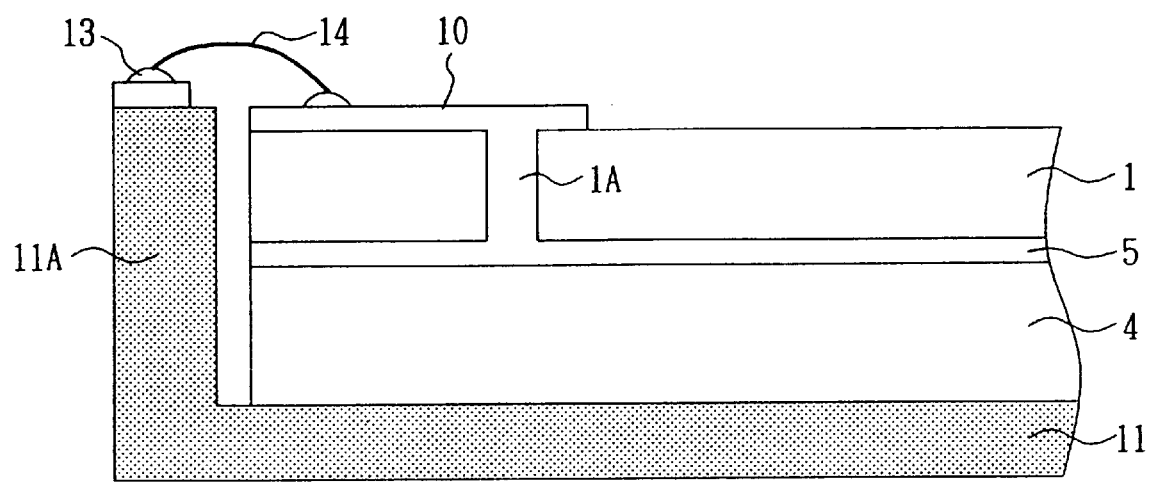
FIG. 5 is a partial sectional view of an IC package on which a two-dimensional MSGC is mounted.

FIG. 5 is a partial sectional view of the IC package on which is mounted the two-dimensional MSGC. The same portions as those shown in FIG. 3 are denoted by identical numerals, and descriptions thereof will be omitted.

In FIG. 5, numeral 4 denotes a base substrate; and numeral 10 denotes a first bonding pad formed on the substrate 1 and connected to the corresponding back strip 5 via a fine through-hole 1A. The edge of the IC package 11 is raised to form a wall portion 11A, and a second bonding pad 13 is formed on the top surface of the wall portion 11A.

The second bonding pad 13 is connected to the first bonding pad 10 through use of a bonding wire 14.

As is schematically illustrated in FIG. 5, signal lines from the base substrate 4 formed of ceramic and disposed under the substrate 1 formed of polyimide thin film are led to the first bonding pads 10 via the fine through-holes 1A and then to the second bonding pads 13. Also, the first bonding pads 10 connected to all the electrodes of the MSGC are disposed on the same substrate surface. These structural features are worthy of attention, as they greatly simplify the connection between the MSGC 1 and the IC packaging 11.

A measured crosstalk between adjacent strips is about 5%, and therefore does not cause a problem in relation to digital readout of data from the MSGC of the present invention.

Next will be described the imaging performance of the MSGC according to the present embodiment.

When the MSGC 102 is used as an X-ray imaging device, as shown in FIG. 2, the MSGC 102 must have electrodes other than the anode strips 2. In addition to the anode strips 2, the MSGC 102 according to the present embodiment has three kinds of electrodes; i.e., the cathode strips 3, the drift plane 6, and the back strips 5. Although the cathodes strips 3 can induce strong signals, the induced signals have a long rising time of about 200 nsec., and the cathode strips 3 run in parallel to the anode strips 2.

Some portion of ions generated due to electron avalanche flows toward the drift plane (drift plate), so that a signal is induced on the drift plane. However, the induction speed of such a signal is very slow (about 10 $\mu$m). In a certain type of MSGC 102, an induced signal was observed on the back plane (back strips). Although the height and shape of a pulse (induced signal) depend on the geometric structure of the electrode of the MSCG, as well as on the thickness and material of the substrate, it is clear that high speed signals can be obtained from the back strips.

The MSGC 102 shown in FIG. 1 has 512 anode strips, 512 back strips, and cathodes.

Very feeble signal pluses output from the MSGC 102 are amplified by wave-shaping/preamplifiers (LeCroy MQS 104). The pulses output from the wave-shaping/preamplifiers have a pulse width of 30 nsec. or less. The output pluses are fed to the preamplifiers discriminators (LeCroy MVL407) 103 and 104, and discrimination signals conforming to the ECL (Emitter-Coupled Logic) standard are output from the preamplifiers discriminators 103 and 104. Each of ICs used in these circuits includes circuits for 4 channels. In the present system, cards each containing the preamplifiers discriminators 103 and 104 for 64 channels are mounted on the motherboard 101 in order to reduce the size of the apparatus.

The outputs under the ECL standard are fed to the data acquisition system via a multi-conductor signal cable. The data acquisition system can be divided into the encoders 113 and 114 for locating the position of a signal ray on the basis of the fed signals, the incident-particle hit judging circuit 115, and the large capacity storage device 116 for storing obtained position information. In addition to these circuits and devices, the computer (i.e., control CPU; Force CPU-7V, SUN compatible) 117 is accommodated within a crate having a width of 9U (VEM standard). The CPU 117 is connected to a high-speed network (presently, 100 Mbps) in order to allow other computers to analyze data obtained by the MSGC 102.

Next will be described in detail the respective portions of the data acquisition system according to the present invention.

(1) Preamplifiers Discriminators:

The gas amplification factor of the MSGC is generally 500, which is very small compared with that of other gas amplifiers in which wires are used. Generally, an amount of charge induced on the MSGC due to incidence of an X-ray of about 8 kev is about $1.0-2.0\times10^{-14}$ C.

Further, in order to separate signals having a frequency of 10 MHz or higher, the signals must be shaped to have a width of about 20 nsec. Further, a huge number of signal lines must be handled. In order to meet these requirements, there must be used high-speed, highly integrated preamplifiers having a large amplification factor.

The preamplifiers used in the present embodiment are MQS 104A (product of LeCroy Corp.), which was originally developed for wire chambers. The ICs constituting preamplifiers has a charge amplification factor of 30 mV/fC. The wave-shaper included in the IC shapes the output waveform to have a half-value width of 20 nsec. Since four circuits are included in each IC of about 1 cm×1 cm, the preamplifiers can be formed to be relatively compact.

The output signals obtained form the anodes and the back electrodes are all converted into binary signals through use of comparators. In consideration of compatibility with the above-described preamplifiers, MVL 407S of LeCroy is used for the comparators. Each of the ICs constituting the comparators includes 4 circuits. Since the MVL 407S provides an ECL differential output, it can drive a cable of about a few meters in length without use of an additional circuit.

Generally, when outputs are obtained from signals lines of a gas amplifier, the outputs are fed to an analog-to-digital converter, and the position of a signal ray is determined based on a weighted mean of several signals from adjacent wires in order to improve positional resolution. Therefore, in general gas amplifiers, the RMS resolution can be increased up to 30 $\mu$m. In the MSGC, since the distance between the strips is very narrow (200 $\mu$m), the RMS resolution can be increased up to about 60 $\mu$m even when there is employed a method based on binary value readout.

In order to allow disposal of the preamplifiers and the wave-height discriminators in high density around the detector, there were manufactured preamplifier discriminator integrated circuit boards that can be mounted vertically on the motherboard which carries the detector.

Although not illustrated, 16 MQS104A chips, 16 MVL407S chips (both surface-mount type) and other integrated-type circuit components are mounted on front and rear surfaces of each of 8 layered printed circuit boards each having a size of about 15 cm×15 cm, thereby realizing circuits for 64 channels. Connection between the printed circuit boards and the motherboard is performed through use of 120-pin connectors disposed at $\frac{1}{20}$-inch intervals. From these connectors are received electrical power for circuits and discrimination voltage, as well as signals.

Since each signal is output in the form of an ECL differential output, two signal lines must be used for each signal. In the present embodiment, two 68-pin half-pitch connectors are mounted in order to allow output of signals for 64 channels. In the MSGC of 10 cm×10 cm, since the number of outputs including outputs from the anodes and the back electrodes is 1024, 16 preamplifier discriminator boards must be used.

(2) Signal Synchronizing Circuits, Data Encoders, and Incident Particle Hit Judgment Circuit:

Since the outputs of the preamplifiers discriminators 103 and 104 correspond to all the signal lines, an amount of data to be handle is quite huge. By contrast, necessary data are only the coordinates representing the position of an incident particle, and therefore, the amount of information for each of the X and Y axes is only about 10 bits. The function of the data encoders is to convert the outputs from the signal lines into the coordinate values of the incident particle. Although the function of the data encoders has conventionally been realized by means of software, in the present embodiment this function is realized by means of hardware in order to speed up the operation of the MSGC data acquisition system. This feature constitutes the core of the system.

The first and second encoders 113 and 114 are mounted on boards of VME-9U, each of which has a double-width front panel. On the front panels are disposed eight connectors for connection with cables extended from the above-described preamplifiers/wave-height discriminators 103 and 104.

Thus, input of signals for 256 channels is enabled. In order to read out data from the MSGC of 10 cm×10 cm, for each of the X- and Y-axis directions, 512 signals must be input. Therefore, two encoder boards for each of the X- and Y-axis directions; i.e., four encoder boards in total, are required. In each encoder board, the ECL differential signal is converted into a TTL (Transistor-Transistor Logic) signal, and is then fed to an encoder circuit formed of a CPLD (Complex Programmable Logic Device). The CPLD is formed through integration of conventional PLDs. In the present system, EPM7192 and EPM7256 (products of Altera Corp.) are used. Since the input signals are asynchronous, a signal synchronizing circuit is disposed in the first stage of the encoder circuit in order to allow subsequent signal processing to be performed in synchronization with clocks.

In the present system, three CPLDs are used for each board. Two of the CPLDs are used for signal synchronization, while the remaining one is used for coordinate encoding. From the encoder circuit are output coordinates of an incident particle, a signal (HIT) indicating the presence/absence of an event in each clock period, a signal (DUP) for invalidating signals when the signals are simultaneously input from the input lines separated away from each other, and a signal indicating that an event causes signals to be output from several adjacent signal lines. These signals are all output to a J3 connector of the VME bus and then transferred to a memory board.

Since the output signals of the MSGC are in the form. of pulses, the signals cannot be confirmed through operation of simply latching the signals through use of flip-flops. Therefore, in the signal synchronizing circuit, the signal input is used for a clock input signal of a flip-flop in order to recognize an edge of the signal input, and the output is cleared through use of a synchronization clock and a next input is waited.

Figure 6:
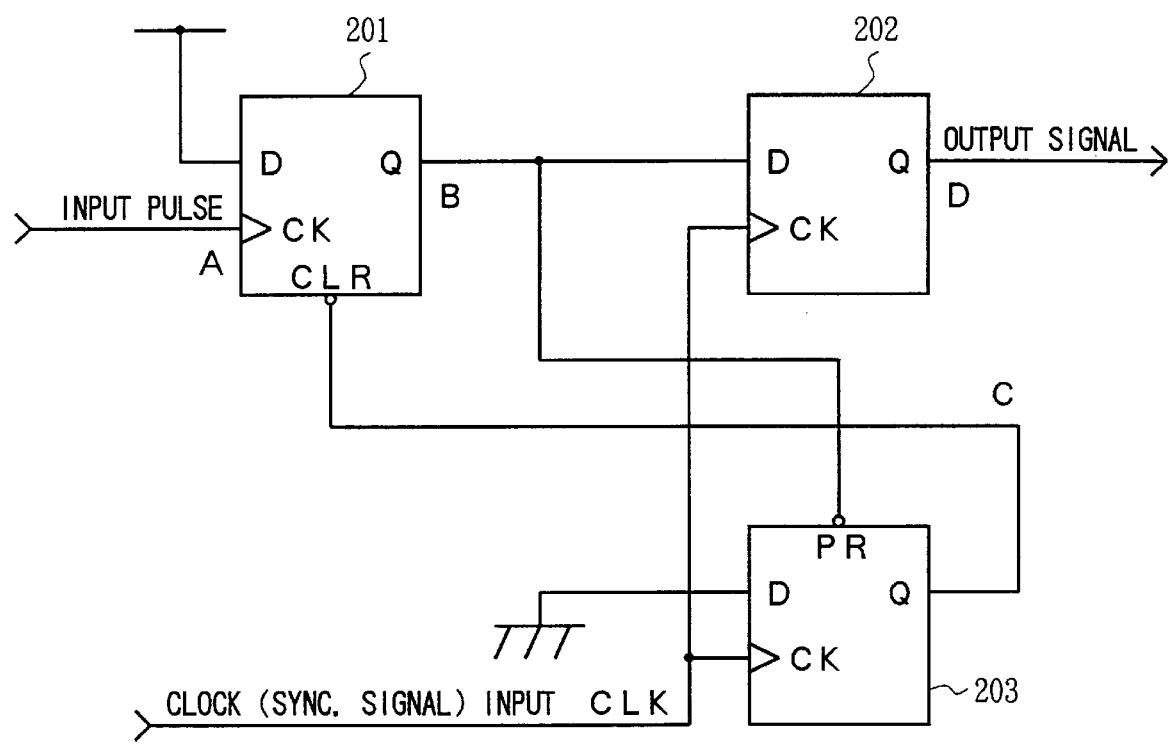
FIG. 6 is a diagram of a circuit (single channel) for synchronizing outputs from the MSGC.
Figure 7:
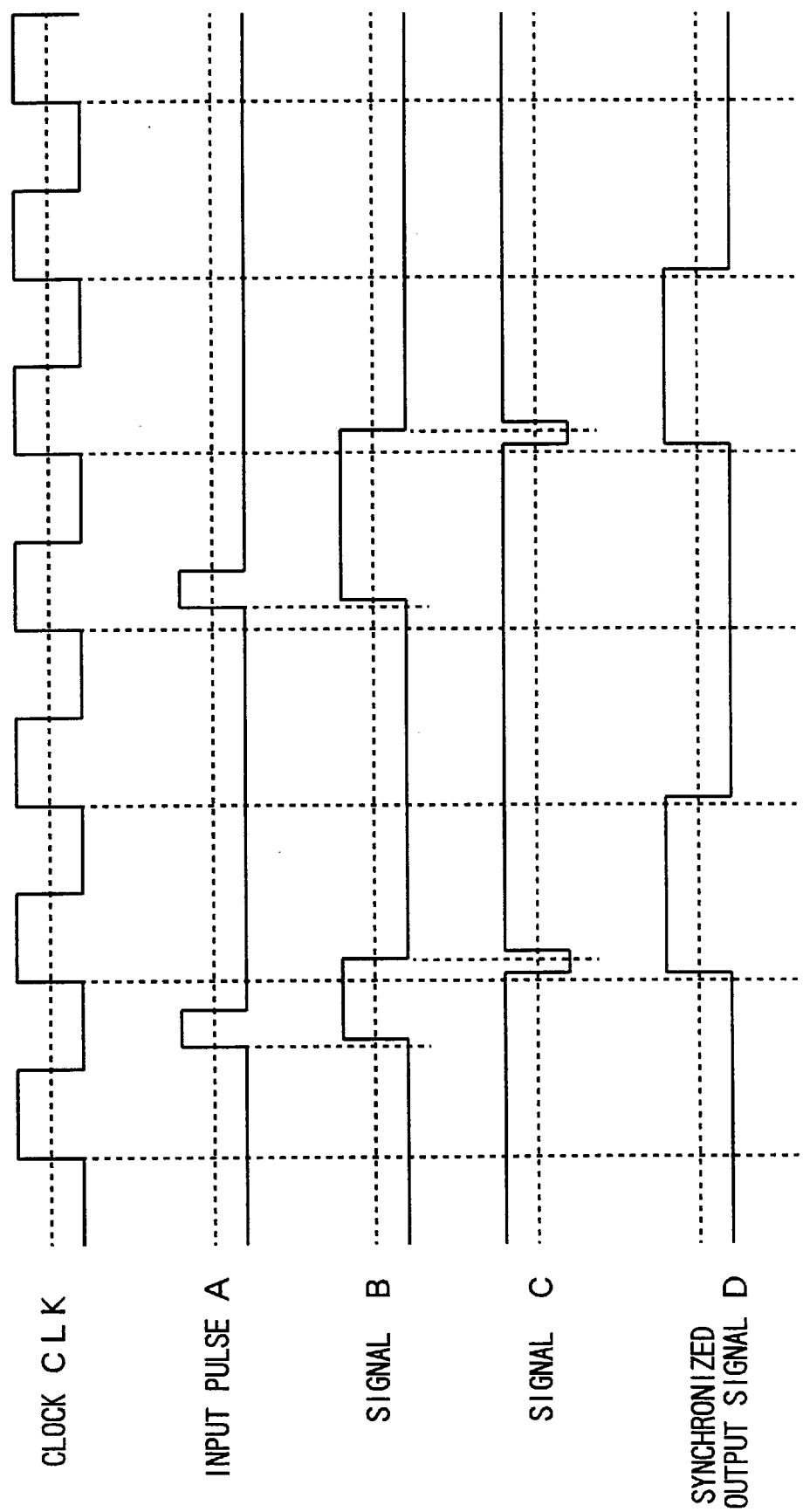
FIG. 7 is a waveform diagram (single channel) for showing waveforms at various portions of the circuit for synchronizing outputs from the MSGC.

FIG. 6 shows the synchronizing circuit for synchronizing the output signal of the MSGC. FIG. 7 shows waveforms at various portions of the synchronizing circuit. These drawings show the circuit and waveforms for a single channel.

As is shown in these drawings, an input pulse A from the MSGC 102 is input to the clock terminal of a first flip-flop 201, and an output pulse B from the Q terminal of the first flip-flop 201 is input to the D terminal of a second flip-flop 202. Further, an output pulse B from the Q terminal of the first flip-flop 201 is input to the PR (preset) terminal of a third flip-flop 203, and a clear signal from the CLR terminal of the first flip-flop 201 is input to the Q terminal of the third flip-flop 203.

The clock (synchronization signal) input CLK are input to the CK terminals of the second and third flip-flops 202 and 203, respectively. The D terminal of the first flip-flop 201 is connected to a power supply line, and the D terminal of the third flip-flop 201 is connected to ground. An output signal; i.e., a signal synchronization output signal D, is output from the Q terminal of the second flip-flop 202.

The CLR terminal of the first flip-flop 201 is connected to the Q terminal of the third flip-flop 203.

The above description is for one channel. When are many channel, as shown in FIG. 8, the output signal B from the Q terminal of each of the first flip-flops 201 is connected to the PR terminal of the corresponding third flip-flop 203 via an OR circuit.

The above-described circuit suffers the following problem. When a signal is input at the same time as the synchronization clock, there arises a difficulty as to whether the input signal is to be regarded a signal in the previous period or a signal in the current period. Generally, the MSGC simultaneously outputs signals from a few adjacent signal lines; and if a time difference exists among these signals, these signals may be treated as two or more different events.

The above-described circuit has wiring for avoiding such a problem. Although this portion does not have a significant meaning as a logic circuit, when timing is considered, the time difference corresponding to the delay (about 10 and a few nsec.) of the circuit can be absorbed. Since each period is separated from adjacent periods, an unavoidable dead time of about 10 nsec. exists in each period. However, parasitic event generation stemming from timing difference can be suppressed almost completely.

In the MSGC, for each event, a few adjacent strips output signals. The coordinate of an incident particle is to be obtained from the mean value thereof. In the encoder circuit, among the values assigned to signal lines that have output signals simultaneously in the same period, the highest and lowest values are selected, and the mean value of the highest and lowest values is calculated as a coordinate. Such calculation can be performed through use of an upper priority encoder and a lower priority encoder. That is, the value of an upper signal line and the value of a lower signal line are obtained through use of these encoders, and the average of these values is obtained. However, an encoder circuit that can receive a few hundreds of inputs is complicated and requires many elements, and the time required for the processing becomes long. In the encoder circuit of the present MSGC, there is employed a scheme that greatly simplifies the encoder circuit, taking into account that in the case of a valid input, signals are output from only a few adjacent signal lines.

Specifically, the input lines are divided into groups each including 16 signal lines. A logical sum of the output of the $n^{th}$ signal line of each group is obtained; and the logical sum is subjected to appropriate encoding in order to obtain the lower bits of the coordinate value. Further, a logical sum of signals (8 signals) in each group is obtained and is then subjected to proper encoding in order to obtain the upper bits of the coordinate value. The operation for combining signals for the upper bit encoding and the lower bit encoding is performed through use of the same CPLDs as those used in the above-described signal synchronization circuit.

Another CPLD is used for calculation of the final coordinate value and judgment as to where signals (duplicate signals) are output simultaneously from separated signal lines.

Figure 9:
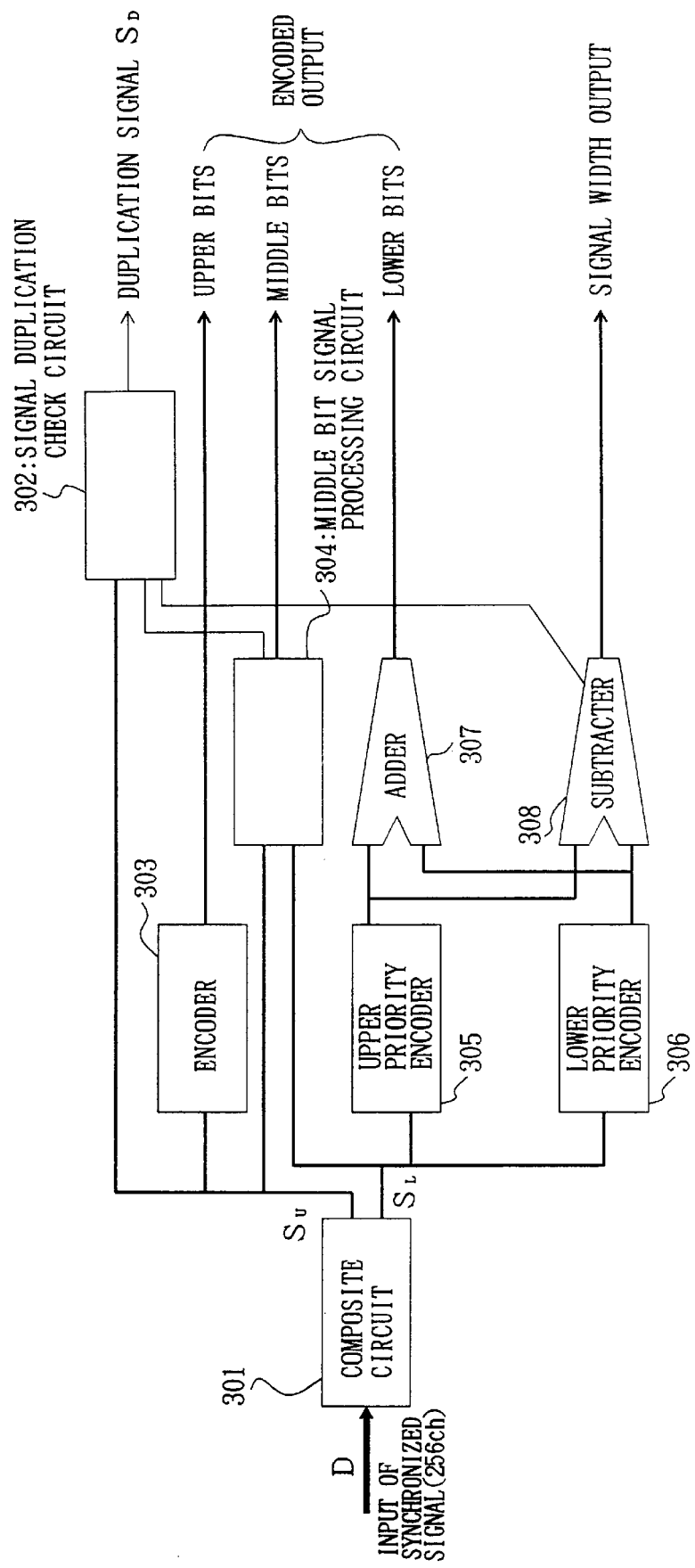
FIG. 9 is a diagram schematically showing the structure of the data encoder.

FIG. 9 is a view schematically showing the structure of the data encoder of the present invention.

The above-described synchronized output signal D is sent to a signal composite circuit 301, and an upper bit composite signal $S_u$ is connected to a duplication check circuit 302, an encoder 303, and a middle bit signal processing circuit 304.

Meanwhile, a lower bit composite signal $S_L$ is supplied to the middle bit signal processing circuit 304, an upper priority encoder 305, and a lower priority encoder 306.

Further, an output signal from the upper priority encoder 305 and an output signal from the lower priority encoder 306 are both sent to an adder 307 and to a subtracter 308.

An output signal from the middle bit signal processing circuit 304 and an output signal from the subtracter 308 are input to the signal duplication check circuit 302.

Thus, a duplication signal $S_D$ is fed from the signal duplication check circuit 302; an upper bit encode output is fed from the encoder 303; a middle bit encode output is fed from the middle bit signal processing circuit 304; a lower bit encoder output is fed from the adder 307; and a signal width output is fed from the subtracter 308.

These signals (signals representing encoded address, number of hit signal lines, hit, and duplication) are connected to a memory board via a J3 back plane bus of VME standard. For address signals for the X-axis and the y-axis, a common bus is used for every two data acquisition boards, while a hit signal is output independently from each board. Based on the hit signal, the source of an address signal presently output can be confirmed. The duplicate signals from the data acquisition boards are commonly output to a single bus.

(3) Large Capacity Storage Device:

The functions of the storage device are to accumulate encoded signals from the respective data acquisition boards, and to serve as an interface with a computer on the VME bus. In the storage device, clocks of 20 MHz are generated and are supplied to the data acquisition boards as system clocks. The outputs from the data acquisition boards are in synchronicity with the clocks. Based on the hit signals and the duplication signals from the respective data acquisition bards, a judgment is made as to whether signals for each clock should be used as input signals.

When no duplication signals are present and a hit signal is output from only one board for the anodes and from one board for the back electrodes, the above-described signals are accepted.

The signals are first input to a FIFO memory and are then stored in a DRAM having a capacity up to 512 MB. The content stored in the DRAM comprises an encoded hit position (position of an incident particle), a number of hit signal lines, a value of ADC externally input to the storage device, time at which the signals are recorded, and the like. These data are selectively used to form 32-bit data for each event. Therefore, the storage device temporarily stores data for 128 million events.

The storage device has a VME bus interface, and is connected to the control computer via the bus. The computer can manipulate registers for controlling various operations of the storage device and can access to the DRAM in which the data are accumulated while using the same address space as that of the CPU. These structures enable the computer to easily handle the acquired data.

(4) Computer:

Various kinds of computers can be used as the control computer provided that the computer conforms to the VME standard. In the present system, a CPU-7V (product of FORCE Corp.) including microSPARC chips is used in combination with a UNIX operating system. Utilization of the strong network function of the UNIX operating system enables the data read out from the storage device by means of the computer to be transferred to a high-speed computer via a high-speed (100 BASE-T) local network, thereby enabling real-time analysis of a large amount of data.

(5) Results of Operation Tests:

Next, a description will be given of results of operation tests that have been performed so far for the case where the MSGC and the data acquisition system are connected.

Figure 10:
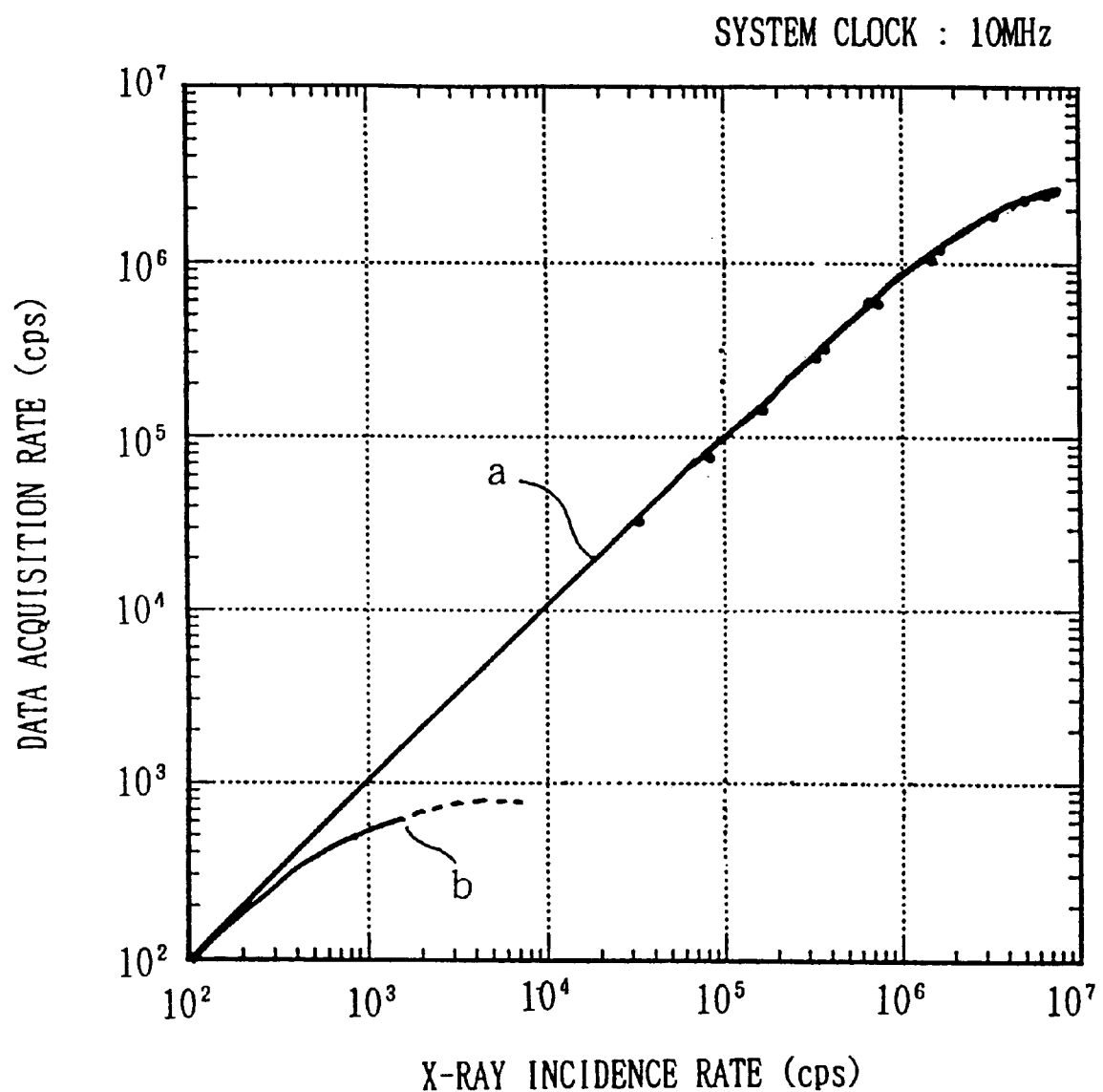
FIG. 10 is a graph showing an actually measured correlation between incident intensity of X-ray and actual date acquisition rate.

FIG. 10 shows an actually measured correlation between X-ray incident intensity and actual data acquisition rate.

In FIG. 10, the horizontal axis represents X-ray incidence rate (cps), and the vertical axis represents data acquisition rate (cps). Curve a indicates the result obtained through use of the data acquisition system of the present invention, while curve b indicates the result obtained through use of a conventional data acquisition system.

In the test, the frequency of clocks was set to 10 MHz. In curve a, when X-ray incidence rate exceeds 3 Mcps, the data acquisition rate saturates. The present data system has a linearity characteristic such that the data acquisition rate increases linearly up to 1 Mcps, and after 1 Mcps the linearity deteriorates gradually. In the present data system, when two or more signals generated by an event are detected in the same clock cycle, the event is ignored. Therefore, even when the clock speed for data acquisition is 10 MHz, data cannot be acquired at this speed. For random input, the upper data acquisition speed is limited to 1/e according to Poisson statistics. In FIG. 10, a data acquisition rate calculated on the basis of Poisson distribution is also shown.

FIGS. 11(a) and (b) show an example of a two-dimensional X-ray transmission image of a pendant obtained by use of the high speed data acquisition system of the present invention.

The exposure time was 8 seconds. FIG. 11(a) shows an image obtained through use of the conventional system in which a data acquisition rate corresponding to 5000 events is $6 \times 10^2$ cps. FIG. 11(b) shows an image obtained through use of the system of the present invention in which a data acquisition rate corresponding to 5 million events is $5.9 \times 10^5$ Cps.

According to the present invention, a very clear X-ray image of a pendant can be obtained within a short period of time.

Although not illustrated, while the pendant shown in FIGS. 11(a) and 11(b) was rotated on a motor, an X-ray transmission image of the pendant was captured through used of the high-speed data acquisition system of the present invention. In this case, a good moving image was obtained.

As described above, in the present invention, combination of the MSGC and the high-speed data acquisition system enables high-speed processing of a large number of output signals from the imaging microstrip gas chamber, which in turn enables reliable measurement of particles.

Next will be described a time resolved measurement for X-ray crystallography by the MSGC of the present invention.

The MSGC combined with the high-speed data acquisition system of the present invention has sufficient potential as a real time X-ray area detector. X-ray crystallography is one of the fields where the MSGC is expected to be most useful. Since the MSGC has both good imaging capability and very fine timing resolution, the transition process of crystals can be measured with millisecond timing resolution.

Conventional detectors have been unable to acquire sequential images with the fast timing resolution. The MSGC according to the present invention enables a new analysis method for crystallography, called the "rotation continuous photograph (RCP)" method.

Next is described an experiment for time resolved crystallography with photo excitation and the RCP method with single crystal.

[1] Time Resolved Measurements of the Photo Excitation Process of Solid Crystal.

A molecule is excited in the process of reactions. In order to investigate the dynamic process of the reaction directly, the excited structure has been observed by use of X-ray diffraction (XRD). However, the lifetime of the excited state is very short (less than a few seconds), and only a few molecules in the sample are excited in the reaction. Therefore, until now observation of excited state by use of XRD has been impossible. The excited state has conventionally been observed only through a spectroscopic method or through some peculiar physical properties. The development of the real-time X-ray area detector would allow direct observation of the process of reactions.

Almost none of the conventional X-ray detectors have ability to observe both time variation and images in an X-ray diffraction method. X-ray films or imaging plates (IP) have commonly been used for static XRD. Although an IP has good imaging capability and dynamic range, time resolved measurement is very difficult. The pulse counting detectors are usable for time resolved measurement. Proportional counters (PC), scintillation counters (SC), and solid semiconductor detectors (SSD) have conventionally been used. However, these conventional pulse counting detectors do not have sufficient imaging capability for real-time measurement, obtaining a two-dimensional diffraction pattern requires scanning on the plane or spherical surface.

The MSGC of the present invention has both excellent imaging capability and a high timing resolution of 20 nsec., which allow high-speed timing analysis for direct observation of reaction processes. An example of observation of excited states is observation of light excitation of metal complexes, which will now be described. Recently, distortion of a diffraction pattern under light irradiation was observed for $[Bu_4N]_4[Pt_2(pop)_4]$ (pop denotes $P_2O_5H_2{}^-$) through use of an X-ray powder diffractometer [Chem, Let, P. 829, 1997]. One peak appearing in an X-ray powder pattern of $[Bu_4N]_4[Pt_2(pop)_4]$ was observed to move toward a higher diffraction angle when light was irradiated, and to return when the light was turned off.

This means that the structure of the unit cell in solid crystal changes as a result of light irradiation. A similar phenomenon was observed for $VO(acac)_2$ (acac denotes acetylacetone: $CH_3C=OCHC=OCH_3$). The diffraction pattern of $VO(acac)_2$ in light-on was shifted by a small angle. These were rare phenomena for solid crystals, and it is considered that these phenomena would constitute a compelling reason to study direct observation of excitation states.

Figure 12A:
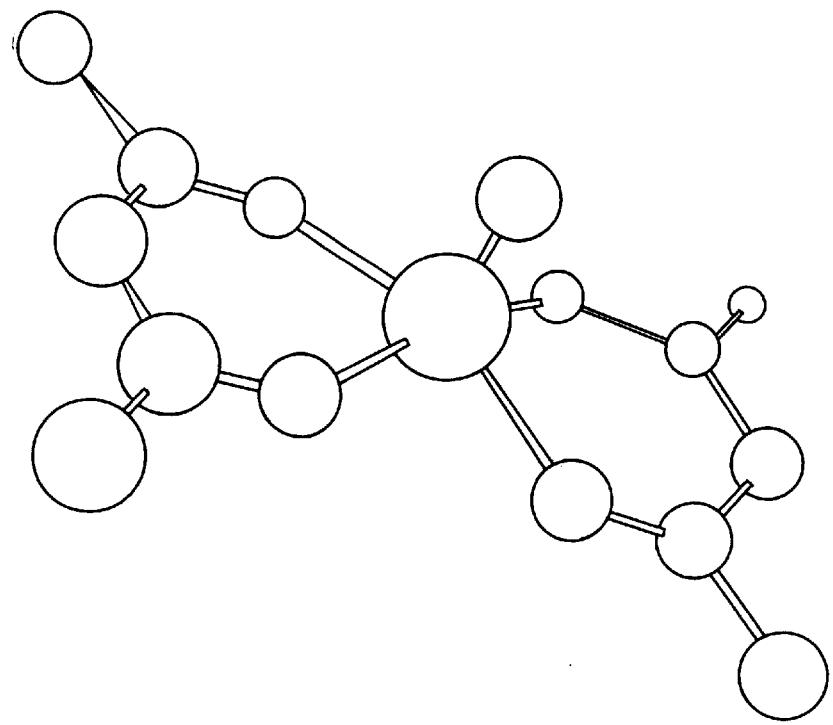
FIGS. 12(a) and 12(b) are illustrations showing the structure of $VO(acac)_2$.
Figure 13A:
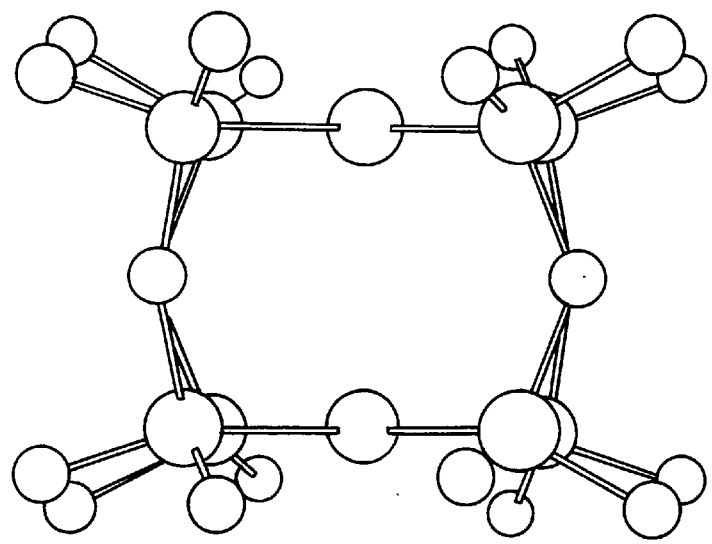
FIGS. 13(a) and 13(b) are illustrations showing the structure of $[Bu_4N]_4[Pt_2(pop)_4]$.
Figure 12B:
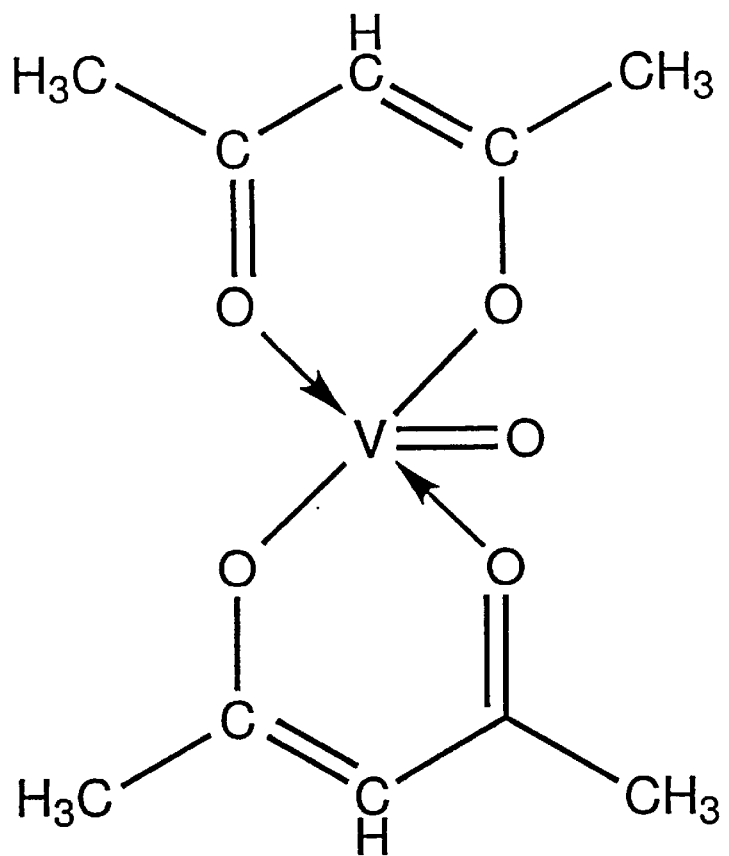
Figure 13B:
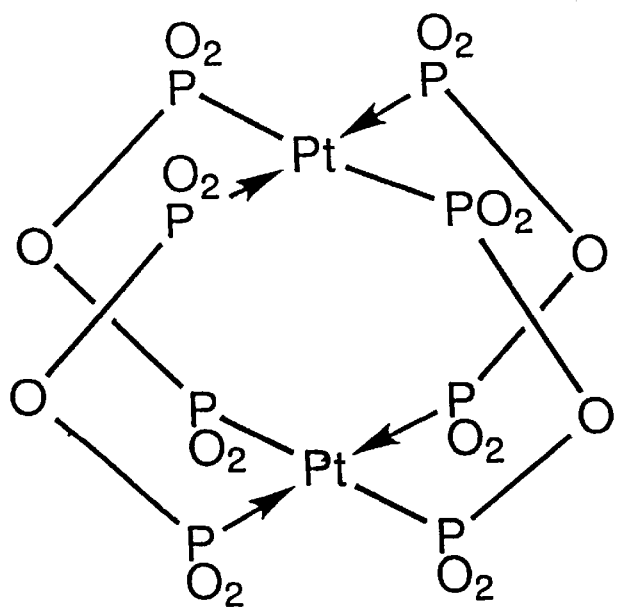

FIGS. 12(a) and 12(b) show the structure of $VO(acac)_2$, and FIGS. 13(a) and 13(b) show the structure of $[Pt_2(pop)_4]$. Specifically, FIG. 12(a) shows the three-dimensional structure of $VO(acac)_2$, and FIG. 12(b) shows the constitutional formula of $VO(acac)_2$. FIG. 13(a) shows the three-dimensional structure of $[Pt_2(pop)_4]$, and FIG. 13(b) shows the constitutional formula of $[Pt_2(pop)_4]$.

Although the time constant of this change is thought to be an important parameter, this has not yet been confirmed. In this experiment, the time constant of the above-described diffraction peak movement has been measured through use of the MSGC. This is the first measurement made possible by the MSGC.

[2] Experimental Setup

The object of the experiment was measurement of the time constant for variation in structure caused through photon excitation. Structural analysis of crystal was not carried out in this measurement. FIG. 14 shows a schematic view of the experiment setup.

In FIG. 14, numeral 102 denotes the MSGC according to the present invention; numeral 110 denotes the high-speed data acquisition system according to the present invention; numeral 401 denotes a xenon light source (xenon lamp); numeral 402 denotes a filter; numeral 403 denotes a convex lens; numeral 404 denotes a shutter, numeral 405 denotes an X-ray tube; numeral 406 denotes a photodiode; numeral 407 denotes a timing generator; and numeral 408 denotes a sample.

In the experiment, powder of crystals of $VO(acac)_2$ and a single crystal of $[BU_4N]_4[Pt_2(pop)_4]$ were used. One diffraction peak for $VO(acac)_2$, the diffraction angle of which is 43° for CrKα (5.4 keV) X-rays, is expected to have a large shift, and the peak shift is expected to be about 0.1°. The peak shift for $[Bu_4N]_4[Pt_2(pop)_4]$ is also expected to be very small (about 0.03°). However, it was reported that the direction of peak shift is opposite that due to thermal influence; therefore the photon excitation effect can be reliably distinguished from the thermal effect.

The sample 408 was placed in front of the MSGC 102, and the distance between the sample 408 and the MSGC 102 was set to 8–9 cm. The xenon light was used as a light source for photo irradiation of the sample.

The xenon light source 401 of 150 W was placed at an angle of 45° with respect to the X-ray beam axis. The optical shutter 404 and the convex lens 403 were disposed between the xenon light source 401 and the sample 408. The filter 402 attached to the xenon light source 401 served to cut the infrared portion of xenon light. The X-ray tube (Cr target) 405 and a vanadium filter (Kα=5.4 keV) were used as an X-ray source. In this energy, a large distortion of diffraction pattern is expected to be 1.5 times greater than that with CuKα (8.0 keV) X-rays. Also, fluorescent X-rays from vanadium atoms in $VO(acac)_2$ was minimized through use of CrKα X-rays. The X-ray source was collimated to 1 mmϕ, and the tube voltage and current were set to 40 kV and 40 mA, respectively. The detector was slanted in the direction of the expected diffraction pattern (or point) so as to avoid the slant incident effect of the MSGC. In this experiment, the angle of this slant was 35–40°.

[3] Measurements and Analysis The powder X-ray diffraction pattern of $VO(acac)_2$ was measured. FIG. 15 shows the image of Debye-Scherrer rings obtained by the MSGC.

In FIG. 15, vertical stripes represent discharge strips, while horizontal stripes are formed due to instability of the electronic readout apparatus. Since the detection plane of the MSGC is tilted away from the vertical plane of the incident X-ray beam, the shape of a Debye-Scherrer ring becomes an ellipse or a hyperbola.

Figure 16:
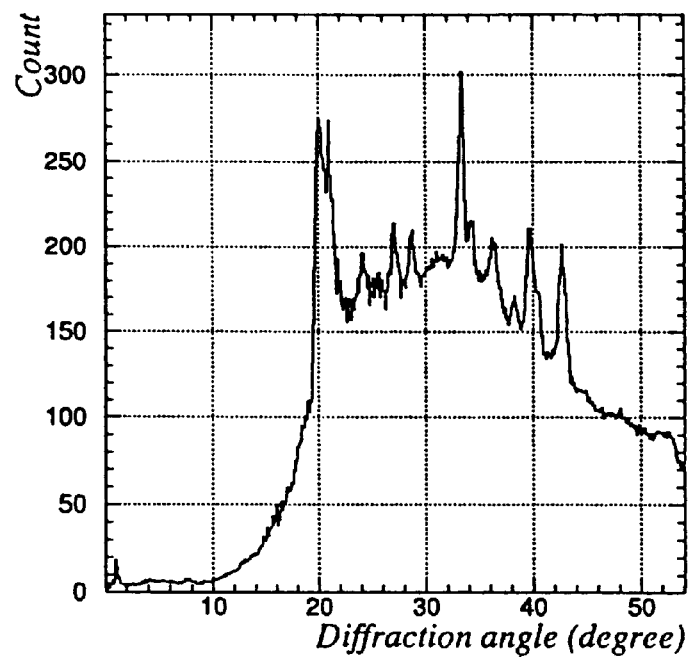
FIG. 16 is a graph showing the powder diffraction pattern of $VO(acac)_2$ with the diffraction angle.
Figure 17:
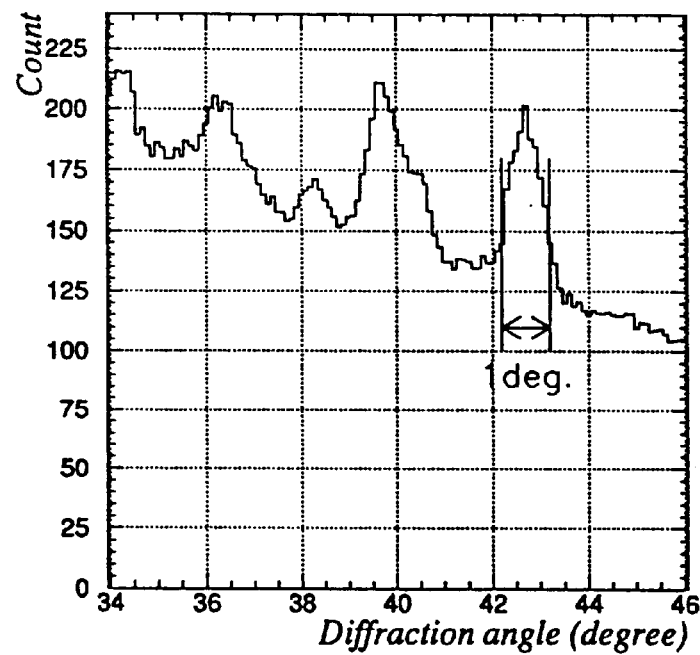
FIG. 17 is a graph showing a portion of the powder diffraction pattern of $VO(acac)_2$ in the vicinity of a diffraction angle of 40°.

FIG. 16 shows the powder diffraction pattern corresponding to a diffraction angle of 2θ for the same data as that of FIG. 15. The movement of the peak at 2θ=43° upon light irradiation was measured by the MSGC. As shown in FIG. 17, the measured peak width was about 1°, which is due to the position resolution of the MSGC (200 μm bin width) and the size of the sample (0.5 mmϕ×1 mm). Obtaining a precise diffraction angle requires a large amount of events and statistical analysis.

The intensity of X-rays was 1.6 kW (40 kV, 40 mA), and the counting rate of the diffracted X-rays was about $10^4$ cps. The counting rate in the peak of FIG. 17 was ~140 cps. In order to obtain sufficient statistics, the light irradiation was chopped every ten or two seconds by the optical shutter having an opening/closing time of 6 ms. The status of the light was monitored by a photodiode disposed behind the sample. The timing of the light chopping was tagged by the signal of the photodiode, and the timing for each X-ray event was recorded with the position data.

Secondly, the time variation of the diffraction spot was measured through use of a single crystal of $[Bu_4N]_4[Pt_2(pop)_4]$. The measurement and analysis were basically the same as those in the powder diffraction case.

The rotation photograph of $[Bu_4N]_4[Pt_2(pop)_4]$ is shown in FIG. 18. In order to obtain particular diffraction spot, all of diffraction spots were obtained by the RCP method at first, and then the crystal was fixed at an angle at which a proper diffraction spot appears. Two diffraction spots were selected in this measurement. The azimuth angle for the analysis was restricted within 3° of the angle of the proper spot.

For the powder of $VO(acac)_2$, the ring on 2θ=42.7° (CrKα) was selected for measurement of the peak shift. FIG.

17 is the diffraction pattern near the proper peak. Through statistical methods, the mean value and its error were calculated, and there were formed graphs shown in FIGS. 19 and 20 in which the horizontal axis represents the elapsed time after light irradiation.

FIG. 19 shows a first example of variation in diffraction angle due to on/off of light. In the measurement, one of the powder diffraction peaks of VO(acac)$_2$ was selected. The span of the data points is 1 sec. FIG. 20 shows a second example of variation in diffraction angle due to on/off of light. In the measurement, one of the powder diffraction peaks of VO(acac)$_2$ was selected. The span of the data points is 100 ms.

From these figures the peak shifts were estimated. The statistical errors for each plotted point are less than 0.01° thanks to the folding method. In FIG. 19, the position shift of the proper peak was found to be 0.2° in the 5 second transition time. The faster component of the peak movement was also sought, as shown in FIG. 20, where the diffraction peak angle was analyzed by use of a time interval of 100 ms. However, no significant fast component was observed. In this sample the direction of the peak movement by photo excitation and that by thermal expansion effect are the same, and these two effects cannot be distinguished in this plot. Nevertheless, the present inventors could successfully demonstrate that the time-resolved measurement with MSGC enables direct observation of the dynamic process of the crystal structure.

In contrast, the light excitation measurement of [Bu$_4$N]$_4$[Pt$_2$(pop)$_4$] sample is expected to distinguish the light effect from the thermal effect.

Figure 21A:
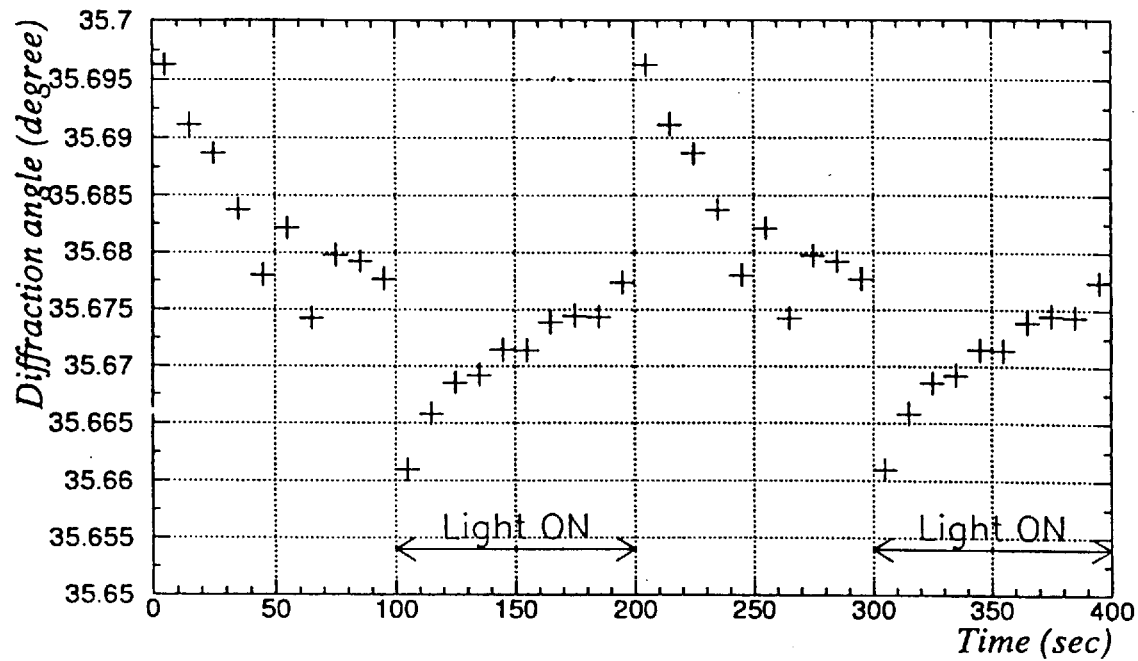
FIGS. 21(a) and 21(b) are plots showing variations in diffraction angle due to on/off of light.
Figure 21B:
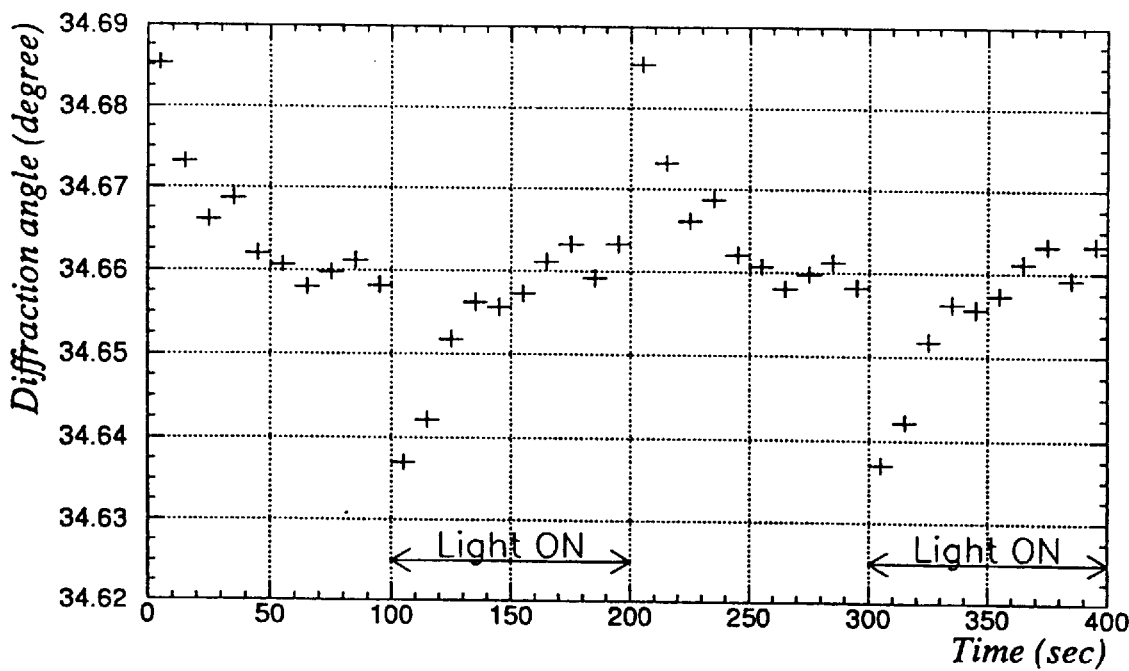

FIGS. 21(a) and 21(b) show variation in diffraction angle due to on/off of light, wherein FIG. 21(a) shows the measurement result for a diffraction angle of 35.7°, and FIG. 21(b) shows the measurement result for a diffraction angle of 34.7°.

In the measurement, two of the diffraction spots (2θ=35.7° in the case of FIG. 21(a), 2θ=34.7° in the case of FIG. 21(b)) of a single crystal [Bu$_4$N]$_4$[Pt$_2$(pop)$_4$] were selected. The data points folding in one cycle are plotted where time 0 represents the end of the photo irradiation. In both cases the duration of light on/off cycle was 200 seconds, and the achieved statistical error for each plotting point was ~0.001° thanks to the folding method. Obviously, these movements have two timing components. One has a slow component with 50 seconds transition time, where the peak moved toward the large diffraction angle with light-on, and the other has a fast component with less than 10 seconds transition time, the peak of which moves in a direction opposite that of the slow component. In these transitions the observed peak movements were both ~0.2°.

FIGS. 22(a) and 22(b) show movement of the diffraction peak determined at 1-second intervals after the light is turned on.

Analyses were carried out each 1 second after the photo irradiation, for the diffraction spot (2θ=34.7°) of the single crystal [Bu$_4$N]$_4$[Pt$_2$(pop)$_4$]. FIG. 22(a) shows the data plots folding in one cycle, and FIG. 22(b) shows the enlarged plots and a fitting curve. Although the statistical errors become less than 0.003° due to low statistics, the fast movement of the diffraction peak was observed clearly just after light irradiation. The time constant of the fast component was obtained as 1.9 seconds.

In order to estimate the movement of the peak attributable to the thermal effect, air having a varying temperature was blown against the sample, and the peak shift was measured in a manner similar to that employed previously. FIG. 23 shows the movement of the diffraction with variation in temperature. As can be seen from FIG. 23, the crystal of [Bu$_4$N]$_4$[Pt$_2$(pop)$_4$] has a tendency of thermal constriction. Therefore, it is concluded that the peak movement of the fast component is due to the light illumination, and the slow component is due to the thermal effect.

[4] Basic Experiments for Structure Analysis in Accordance with the RCP Method through Use of MSGC
(Earlier Methods for Crystal XRD Analysis)

A two-dimensional image of an X-ray diffraction pattern is not sufficient for obtaining the three-dimensional information of an objective crystal.

When a monochromatic X-ray beam is used, several diffraction patterns are taken as the angle between one axis of the crystal and the X-ray beam is varied over an acceptable angle range. The use of the MSGC enables measurement of the arrival time of each X-ray photon with a time resolution of a few tens of nanosec. Therefore, when an X-ray diffraction photograph is taken while the crystal is rotated, in addition to a diffraction image there can be accurately obtained the angle of rotation of the crystal. This allows us to obtain all the information needed for three-dimensional crystal analysis from only one measurement.

Conventionally, for analyzing the crystal structure, the following two steps are required:
(a) estimating the size, form of unit cell, and space group of the sample; and
(b) obtaining all positions and strengths of diffraction points.

For any wavelength λ of X-rays, the reflection points from the sample crystal appear on Ewald's sphere in the reciprocal lattice, as shown in FIG. 24. In FIG. 24, numeral 500 denotes an X-ray beam axis, numeral 501 denotes Ewald's sphere, and numeral 502 denotes the reciprocal lattice.

The origin of this reciprocal lattice space O must be located on Ewald's sphere, and the diametrical line including the origin corresponds to the path of the incident X-rays. Although the lattice is three dimensional, the conventional XRD method can provide only two-dimensional information. Then, another dimension is needed for obtaining the image of the reciprocal lattice.

The Laue photograph is one of the popular techniques for obtaining the projection of the reciprocal lattice. By use of a white X-ray beam, the lattice point having a polar angle 2θ and an azimuth φ is projected on an X-ray film. This method requires some known parameters, such as the crystal system, for reconstructing a three-dimensional point on the lattice for each spot. Therefore, for crystals of which axes are unknown, we must attempt to take several photographs so as to obtain an accurate axis.

Another popular method is the oscillation photograph, which uses a monochromatic X-ray beam. When the crystal is oscillated between θ$_1$ and θ$_2$, as shown in FIG. 25, the image appearing on film corresponds to the lattice point in the gray region in FIG. 25. In FIG. 25, numeral 601 denotes Ewald's sphere, and numeral 602 denotes the reciprocal lattice.

In this method, the diffraction angles of the points in the image are accumulated over the oscillated angles, and the exact structure of lattice has to be estimated through use of known parameters as well as the Laue photograph. Transforming the diffraction spots into the reciprocal lattice requires many trials involving various oscillation angles.

Figure 26:
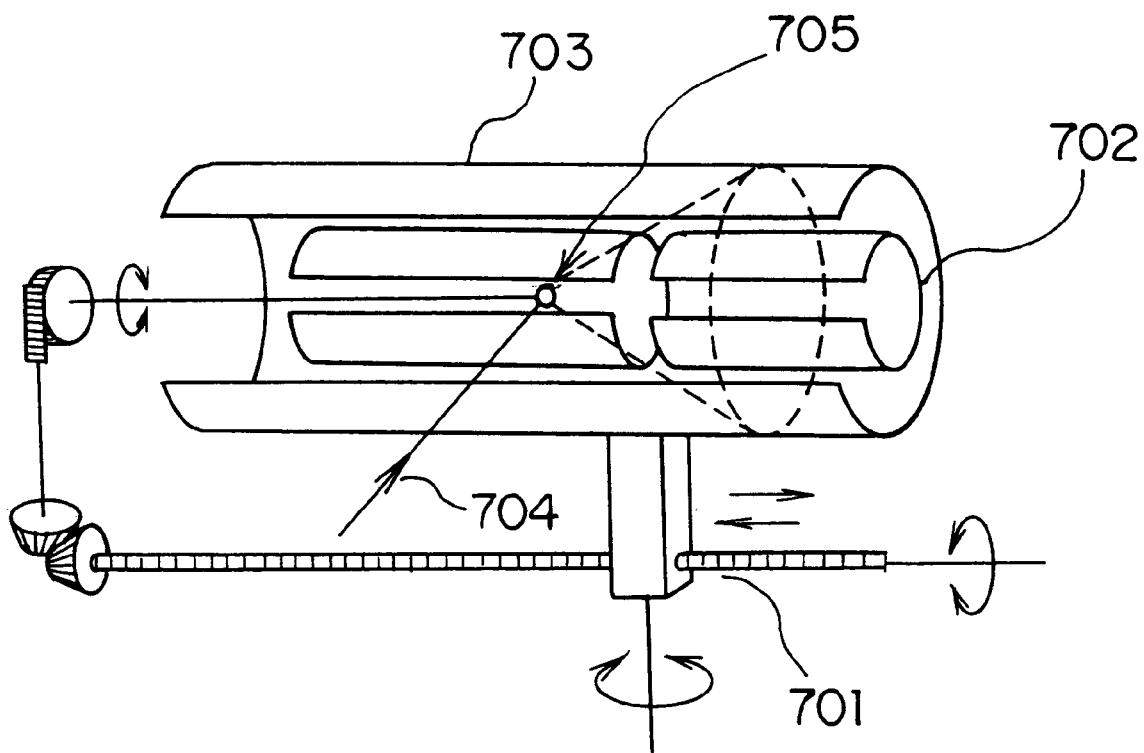
FIG. 26 is a view schematically showing the structure of a Weissenberg camera.

The Weissenberg camera provides the other projection of the reciprocal lattice. The schematic structure of this camera is shown in FIG. 26. In FIG. 26, numeral 701 denotes a mechanism for rotating a cylindrical X-ray film, numeral 702 denotes a screen, numeral 703 denotes a cylindrical X-ray film, numeral 704 denotes an X-ray beam, and numeral 705 denotes a sample crystal. The crystal 705 rotates about one of the crystal axes, and the cylindrical X-ray film 703 is moved simultaneously along the same axis of the rotation. A cylindrical slit is present between the sample crystal 705 and the X-ray film 703 in the direction of the axis of the rotation, and any one diffraction pattern layer (e.g., (hk0), (hk1) . . . ) of the diffraction pattern is measured as a two-dimensional pattern along the rotation angle of the crystal. In this measurement, accurate coincidence of the rotation axis with one of the crystal axes is necessary. Mainly this method is used for obtaining the size and the crystal system of the unit cell.

In order to estimate the exact intensity of all X-ray diffraction spots, a four-axis X-ray diffractometer is generally employed. The sample crystal can be rotated about three axes ($\phi$, $\kappa$, $\omega$), and the pulse counting detector (such as a scintillation counter or a proportional counter) is rotated about the 2$\theta$ axis. Through use of this diffractometer, all the lattice points in reciprocal space within the sphere of 2/$\lambda$ radius are measured exactly, as are the intensities of all spots. Since this detector is of a 0-dimensional (point-like) type, scanning all the reciprocal space takes much time. In general, 10 to 20 hours are required for measurement of a typical unorganized crystal.

[5] Three-dimensional XRD Method by Use of MSGC

The MSGC can obtain both the positions and timings of incident X-rays. Since correspondence can be established between the rotational angle of the sample crystal and the timings of the incident X-rays, both the position of the diffraction spot and its rotational angle can be measured. Therefore, a wide region of the reciprocal space of the sample crystal is calculated simultaneously through use of only the data obtained by use of the MSGC. Here this method is called the Rotation Continuous Photograph (RCP) method. In this method, not only are the three-dimensional lattice points observed quickly (less than a few minutes depending on the light source intensity and the rotation speed), but also exact matching of the axis of crystal to the rotational axis is not required. Both the size of the unit cell and the lattice constant are simultaneously obtained from observed three-dimensional points. Repetition trials of measurements of X-ray images for axis fixing are no longer necessary. In addition, the intensity of each diffraction spot is measured exactly due to the pulse counting capability of the MSGC.

[6] Measurement According to the RCP Method and Results

In this section, a description will be given of the results of a RCP measurement performed by use of the MSGC.

An X-ray tube having a copper target and a nickel filter (K$\alpha$: 8.0 kev) was used as an X-ray source. As a sample, a single crystal of phenothiazine-benzilic acid complex was used. The sample was placed on the rotatable goniometer. The rotation speed of crystal was 216 seconds/cycle, which corresponds to 5/3 degree/second. The MSGG was placed normal to the X-ray beam, and the center of the beam was pointed at one edge of the detection area.

Figure 27:
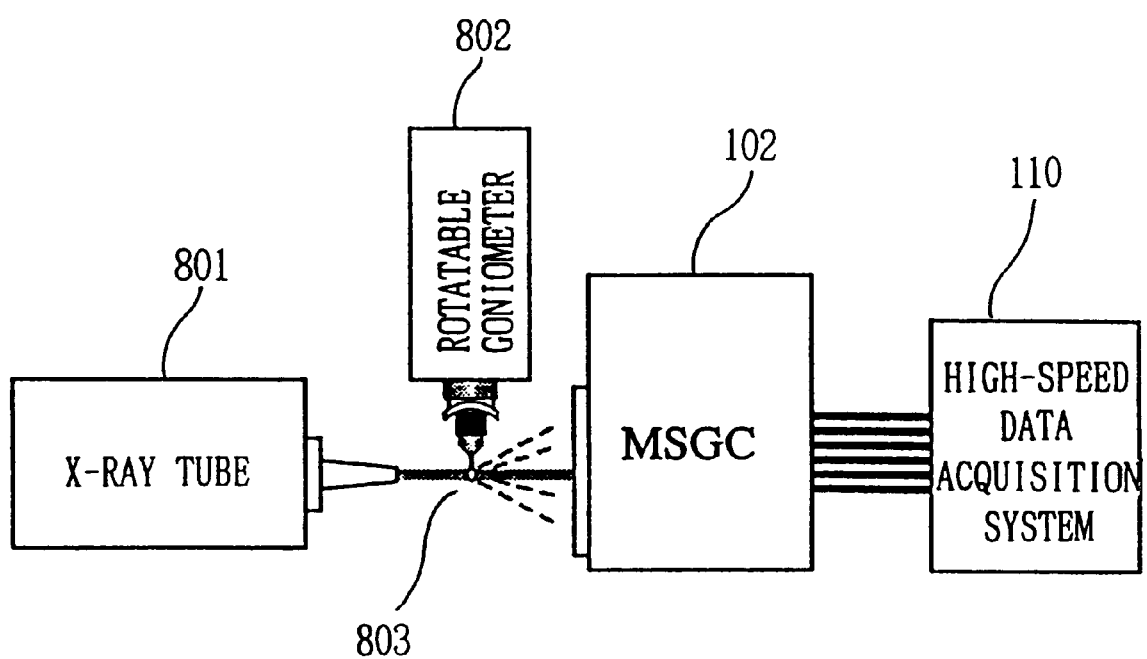
FIG. 27 is a block diagram showing an experimental setup utilizing the RCP method.

FIG. 27 shows the schematic view for this experiment.

In FIG. 27, numeral 801 denotes the X-ray tube (Cu target, 8.0 keV), numeral 802 denotes the rotatable goniometer (5/3 degree/second), and numeral 803 denotes a sample. The positions of diffracted X-rays and their timings were measured by use of the MSGC 102 and the high-speed data acquisition system 110. The operating voltage and current of the X-ray tube were 40 kV and 40 mA, and the 1 mm$\phi$ collimated X-ray beam was radiated to the sample 803. The size of sample 803 was about (0.5 mm)$^3$. In this measurement, the counting rate was 2000 to 10000 events/second. All the time stamps for each X-ray event were recorded.

FIG. 28 shows a two-dimensional image of diffraction pattern integrated during a-single rotation of the crystal. In this drawing, many diffraction spots and much background X-ray noise can be seen. It is to be noted that the crystal axis is not precisely parallel to the rotation axis.

Figure 29:
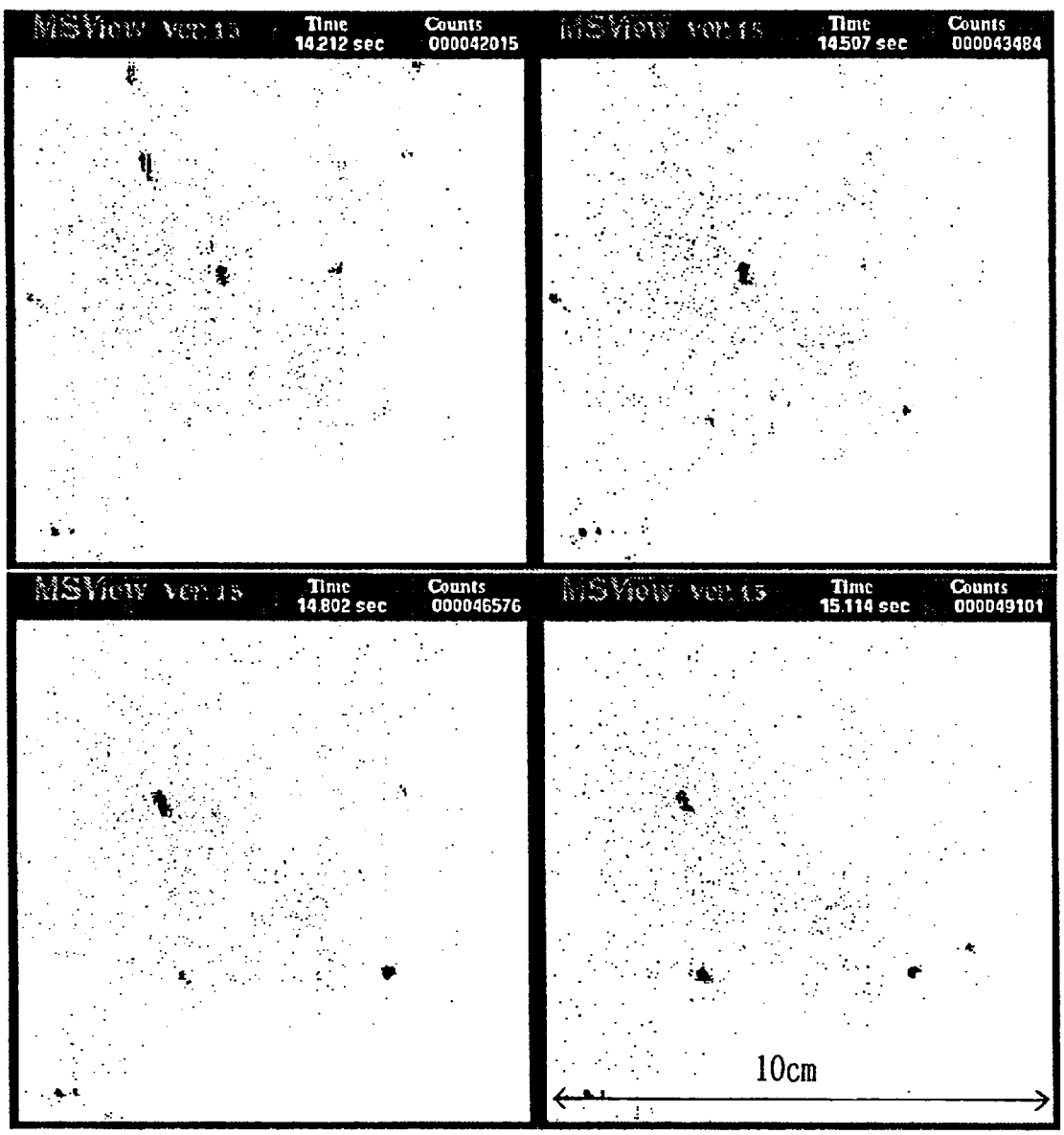
FIG. 29 shows time resolved sequential images observed every 0.3 second exposure time.

FIG. 29 shows the time resolved sequential images observed every 0.3 second interval of exposure time. Each picture corresponds to 0.5° width of an oscillation X-ray picture. Diffraction points are found to be very clear as compared with the case of the integrated image shown in FIG. 28. In this measurement, the S/N ratio of diffraction spots in time (angle) resolved picture was 100 to 300.

Figure 31:
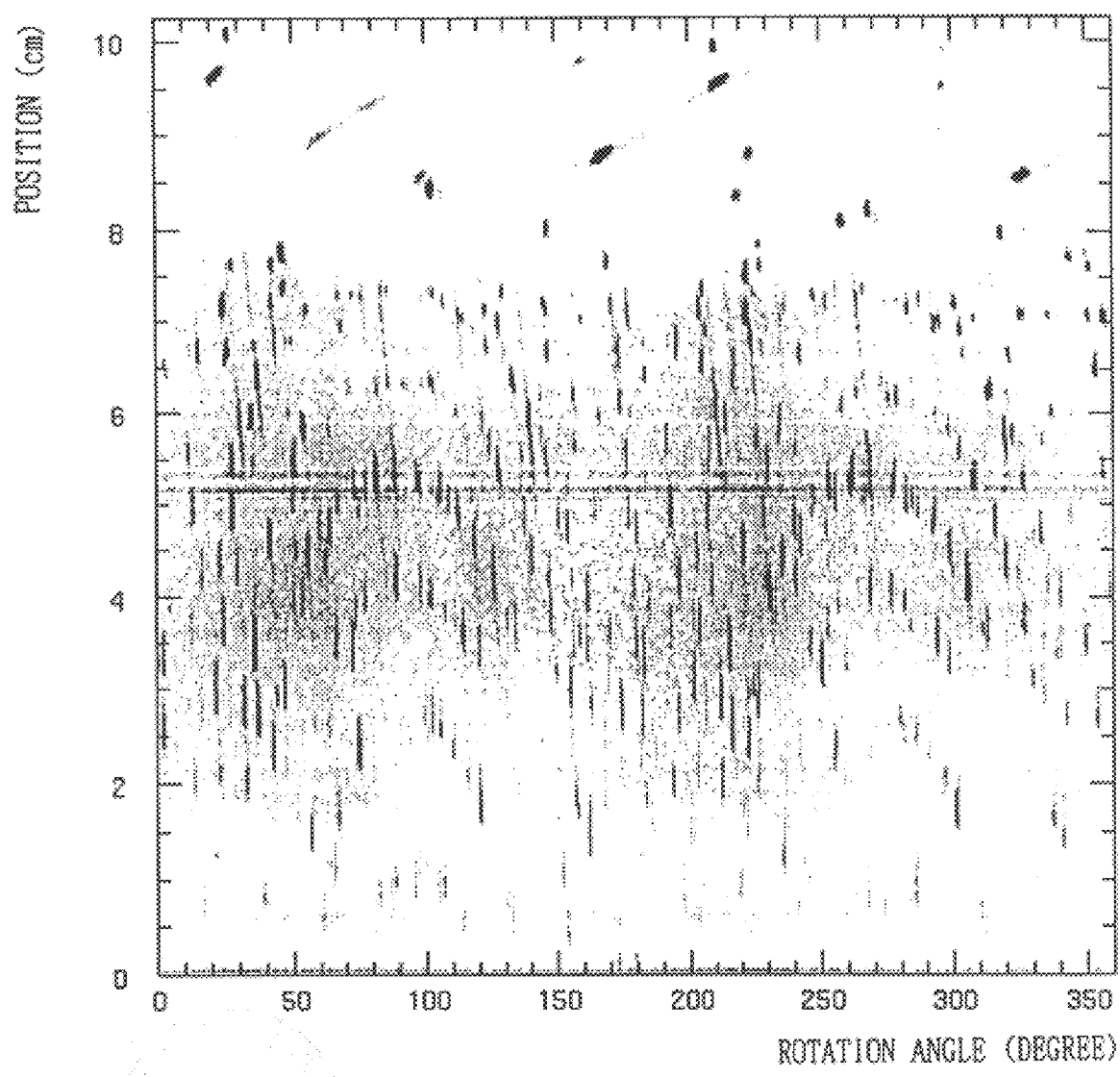
FIG. 31 is a projection of the three-dimensional image of FIG. 30 onto the y-$\phi$ plane.

FIG. 31 shows a three-dimensional image in which each spot is plotted according to its two-dimensional position (x, y) and the rotation angle of the crystal ($\phi$). The projection of this figure into the (y, $\phi$) plane is shown in FIG. 31. Clear peaks concentrated over 0.5° can be found, Indicating that the noise away from the peak can be easily removed through use of the angle information.

Figure 30:
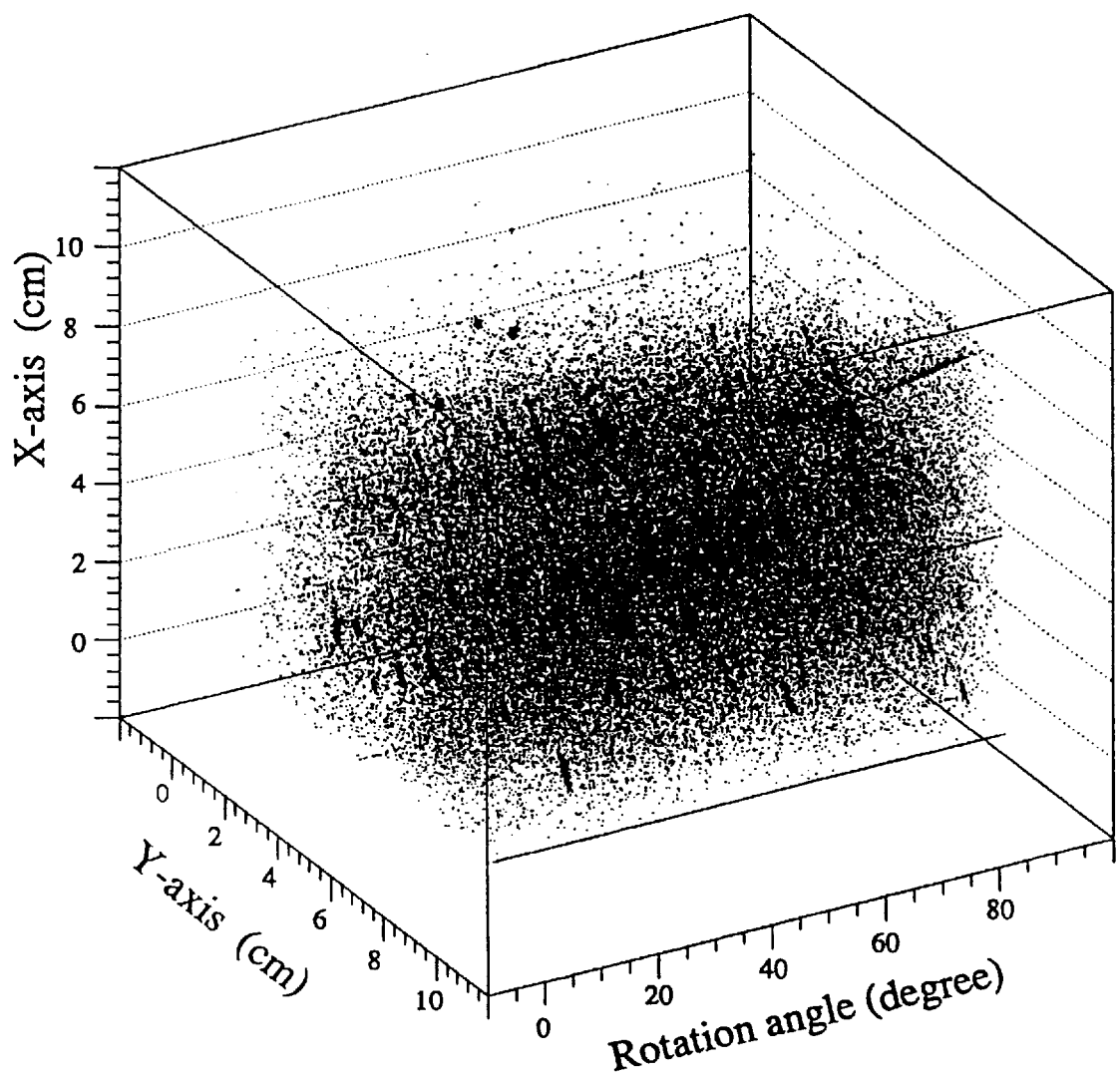
FIG. 30 is a three-dimensional image of diffraction spots in which each spot is plotted according to its two dimensional position (x, y) and the rotation angle of the crystal ($\phi$)

FIG. 32 corresponds to FIG. 30 and shows the state in which the noise reduction method is employed.

In the above-described embodiment, a description has been given of measurement of solid crystal. However, the present invention is not limited thereto and may be applied to the following measurements for moving samples:

(1) For a sample in liquid form, a high-speed, time-resolved X-ray diffraction image can be obtained as for solid crystals. This enables direct observation of physical changes of solution caused by light, heat, etc.; chemical changes caused by mixture of substances; and biological changes such as change in the structure of protein.

(2) Time-resolved measurement can be performed not only for X-ray diffraction (scattering) images but also for X-ray transmission images. This enables real-time, non-destructive photography of flow of fluid in piping, flow of blood within an organism, or the like.

The present invention is not limited to the above-described embodiments. Numerous modifications and variations of the present invention are possible in light of the spirit of the present invention, and they are not excluded from the scope of the present invention.

What is claimed is:

1. A microstrip gas chamber high-speed data acquisition system, comprising:

(a) discrimination circuits for binary conversion of signals from anode strips and back strips of a two-dimensional microstrip gas chamber;

(b) signal synchronizing circuits for converting binary asynchronous signals output from the discrimination circuits into clock-synchronized signals;

(c) data encoder circuits connected to the signal synchronizing circuits;

(d) an incident-particle hit judgment circuit connected to the data encoder circuits and operating such that when among a plurality of input signal lines for each of the vertical and horizontal axes a plurality of adjacent signal lines receive signals at the same timing, the incident-particle hit judgment circuit outputs a value corresponding to a signal line at the center of the adjacent signal lines, and when separated signal lines receive signals at the same timing, the incident-particle hit judgment circuit ignores the signals;

(e) a storage device connected to the incident-particle hit judgment circuit and adapted to store, for each event, the vertical and horizontal coordinates of an incident particle, the timing of incidence of the particle, the degree of spreading of output signals, and the energy of the incident particle obtained from an overall pulse height; and (f) a computer connected to the storage device.

2. A microstrip gas chamber high-speed data acquisition system according to claim 1, wherein an amplifier is connected to each of the anode strips and back strips of the microstrip gas chamber, and an output signal from the amplifier is input to the corresponding discrimination circuit.

3. A microstrip gas chamber high-speed data acquisition system according to claim 1, wherein the data encoder circuit comprises an upper priory encoder, a lower priority encoder, and an adding circuit, and wherein the values of signals transmitted through upper and lower signal lines are obtained through use of the upper priory encoder and the lower priority encoder, and the mean value of the thus-obtained values is used for calculation of the coordinates of an incident particle.

4. A microstrip gas chamber high-speed data acquisition system according to claim 1, wherein each of the signal synchronizing circuits, the data encoder circuits, and the incident-particle hit Judgment circuit is formed of a CPLD (Complex Programmable Logic Device).

5. A microstrip gas chamber high-speed data acquisition system according to claim 1, wherein the two-dimensional microstrip gas chamber comprises:

(a) a substrate formed of organic thin film having elasticity;

(b) anode strips and cathode strips formed on the substrate to be alternately arranged in parallel;

(c) a high voltage source for applying high voltage between the anode strips and the cathode strips;

(d) back strips formed on the lower face of the substrate to intersect the anode strips and the cathode strips;

(e) a drift plane disposed a predetermined distance away from the substrate; and (f) a gas source for supplying a gas to be passed through a space between the surface of the substrate and the drift plane, wherein (g) electron amplification effect of the gas is caused, and signals regarding an X-ray or particle are extracted for simultaneous measurement of the two-dimensional coordinates of the X-ray or particle.

6. A microstrip gas chamber high-speed data acquisition system according to claim 5, wherein the opposite edge portions of each of the cathode strips are coated with organic thin film having elasticity.

7. A microstrip gas chamber high-speed data acquisition system according to claim 5, wherein the organic thin film having elasticity is polyimide film.

8. A microstrip gas chamber high-speed data acquisition system according to claim 6, wherein the organic thin film having elasticity is polyimide film.

9. A microstrip gas chamber high-speed data acquisition system according to claim 5, wherein the surface of the substrate is coated with organic titanium in order to control the surface resistance.

10. A microstrip gas chamber high-speed data acquisition system according to claim 5, wherein an IC package is provided under the back strips, and the IC package is an LSI high-density package.

11. A microstrip gas chamber high-speed data acquisition system according to claim 5, wherein the back strips are connected to first bonding pads on the top surface of the substrate through fine through-holes; the edge portion of the IC package is raised to form a wall portion; second bonding pads are formed on the top surface of the wall portion; and the first and second bonding pads are connected with each other through use of bonding wires.

12. A microstrip gas chamber high-speed data acquisition system according to claim 5, wherein the two-dimensional microstrip gas chamber is used as an X-ray imaging detector by use of X-ray irradiation.

* * * * *